(12) United States Patent
Tsumagari

(10) Patent No.: US 11,807,071 B2
(45) Date of Patent: Nov. 7, 2023

(54) AIR-CONDITIONING UNIT FOR VEHICLE

(71) Applicant: DENSO CORPORATION, Kariya (JP)

(72) Inventor: Yuki Tsumagari, Kariya (JP)

(73) Assignee: DENSO CORPORATION, Kariya (JP)

( * ) Notice: Subject to any disclaimer, the term of this patent is extended or adjusted under 35 U.S.C. 154(b) by 547 days.

(21) Appl. No.: 17/095,350

(22) Filed: Nov. 11, 2020

(65) Prior Publication Data

US 2021/0061061 A1 Mar. 4, 2021

Related U.S. Application Data

(63) Continuation of application No. PCT/JP2019/017776, filed on Apr. 25, 2019.

(30) Foreign Application Priority Data

May 17, 2018 (JP) .................................. 2018-095209

(51) Int. Cl.
*B60H 1/00* (2006.01)

(52) U.S. Cl.
CPC ..... *B60H 1/00564* (2013.01); *B60H 1/00021* (2013.01); *B60H 1/00321* (2013.01); *B60H 2001/00085* (2013.01); *B60H 2001/00092* (2013.01); *B60H 2001/00107* (2013.01)

(58) Field of Classification Search
CPC ............ B60H 1/00564; B60H 1/00021; B60H 2001/00085; B60H 2001/00092; B60H 2001/00107
USPC ........................................................ 165/122
See application file for complete search history.

(56) References Cited

U.S. PATENT DOCUMENTS

| | | | |
|---|---|---|---|
| 5,620,370 A * | 4/1997 | Umai | F04D 29/663 181/225 |
| 6,261,172 B1 | 7/2001 | Shibata | |
| 10,696,126 B2 * | 6/2020 | Kato | B60H 1/00 |
| 11,254,187 B2 * | 2/2022 | Maeda | B60H 1/12 |
| 11,511,594 B2 * | 11/2022 | Yonezu | B60H 1/0005 |
| 11,554,630 B2 * | 1/2023 | Maeda | B60H 1/00828 |

(Continued)

FOREIGN PATENT DOCUMENTS

| | | |
|---|---|---|
| DE | 10001629 A1 | 8/2000 |
| DE | 102005002199 A1 | 7/2006 |

(Continued)

*Primary Examiner* — Jon T. Schermerhorn, Jr.
(74) *Attorney, Agent, or Firm* — Harness, Dickey & Pierce, P.L.C.

(57) ABSTRACT

An air-conditioning unit includes an air-conditioning case, a blower, and a cooling heat exchanger disposed at a position upstream of the blower. The blower includes a rotational shaft and a suction opening. The cooling heat exchanger includes a facing portion that overlaps with the suction opening in the axial direction and a non-facing portion that does not overlap with the suction opening in the axial direction. The air-conditioning case includes a projected region that is virtually formed by projecting the facing portion toward an upstream side of the air-conditioning case along the axial direction. The air-conditioning case defines introducing openings at positions outside of the projected region. At least a first one of the introducing openings is located on a side of the projected region opposite to at least a second one of the introducing openings.

7 Claims, 16 Drawing Sheets

(56) References Cited

U.S. PATENT DOCUMENTS

| | | | | |
|---|---|---|---|---|
| 11,654,745 B2* | 5/2023 | Yonezu | ............. | B60H 1/00021 |
| | | | | 62/426 |
| 11,660,928 B2* | 5/2023 | Kosaka | ............. | B60H 1/00021 |
| | | | | 454/143 |
| 2015/0291019 A1 | 10/2015 | Hatta et al. | | |
| 2016/0114648 A1 | 4/2016 | Ueno | | |
| 2016/0288609 A1* | 10/2016 | Yamaoka | ........... | B60H 1/00021 |
| 2019/0077213 A1 | 3/2019 | Kato et al. | | |
| 2019/0270359 A1* | 9/2019 | Kato | ................. | B60H 1/00028 |
| 2020/0223281 A1* | 7/2020 | Ide | .................... | B60H 1/00521 |
| 2021/0331551 A1* | 10/2021 | Kato | ................. | B60H 1/00064 |

FOREIGN PATENT DOCUMENTS

| | | |
|---|---|---|
| DE | 112017002430 T5 | 1/2019 |
| EP | 2916383 A1 | 9/2015 |
| JP | H11348536 A | 12/1999 |
| JP | 2000006638 A | 1/2000 |
| JP | 2010100139 A | 5/2010 |
| JP | 2016078797 A | 5/2016 |
| JP | 2018001911 A | 1/2018 |

* cited by examiner

AIR-CONDITIONING UNIT FOR VEHICLE

CROSS REFERENCE TO RELATED APPLICATION

The present application is a continuation application of International Patent Application No. PCT/JP2019/017776 filed on Apr. 25, 2019, which designated the U.S. and claims the benefit of priority from Japanese Patent Application No. 2018-095209 filed on May 17, 2018. The entire disclosures of all of the above applications are incorporated herein by reference.

TECHNICAL FIELD

The present disclosure relates to an air-conditioning unit for a vehicle that conditions an air in a vehicle cabin.

BACKGROUND

An air-conditioning unit for a vehicle in which an evaporator serving as a cooling heat exchanger is disposed at a position upstream of a blower in an airflow direction in an air-conditioning case has been known. In the air-conditioning unit, the cooling heat exchanger and the blower face each other and the air-conditioning case defines multiple introducing openings through which air is introduced toward the cooling heat exchanger in an upper portion of the air-conditioning case.

SUMMARY

An air-conditioning unit for a vehicle includes an air-conditioning case, a blower, and a cooling heat exchanger. The air-conditioning case defines an air passage for an air to be blown into a vehicle cabin. The blower is housed in the air-conditioning case. The cooling heat exchanger is disposed in the air-conditioning case at a position upstream of the blower in an airflow direction and configured to cool the air to be blown into the vehicle cabin. The blower includes a rotational shaft and a suction opening through which the air is sucked into the blower in an axial direction of the rotational shaft. The suction opening faces the cooling heat exchanger in the axial direction. The cooling heat exchanger includes a facing portion that overlaps with the suction opening in the axial direction and a non-facing portion that does not overlap with the suction opening in the axial direction. The facing portion is surrounded by the non-facing portion. The air-conditioning case includes a projected region that is virtually formed by projecting the facing portion toward an upstream side of the air-conditioning case along the axial direction. The air-conditioning case defines multiple introducing openings at positions outside of the projected region. At least a first one of the multiple introducing openings is defined on a side of the projected region opposite to at least a second one of the multiple introducing openings other than the at least first one of the multiple introducing openings.

DESCRIPTION OF EMBODIMENTS

Figure 1:
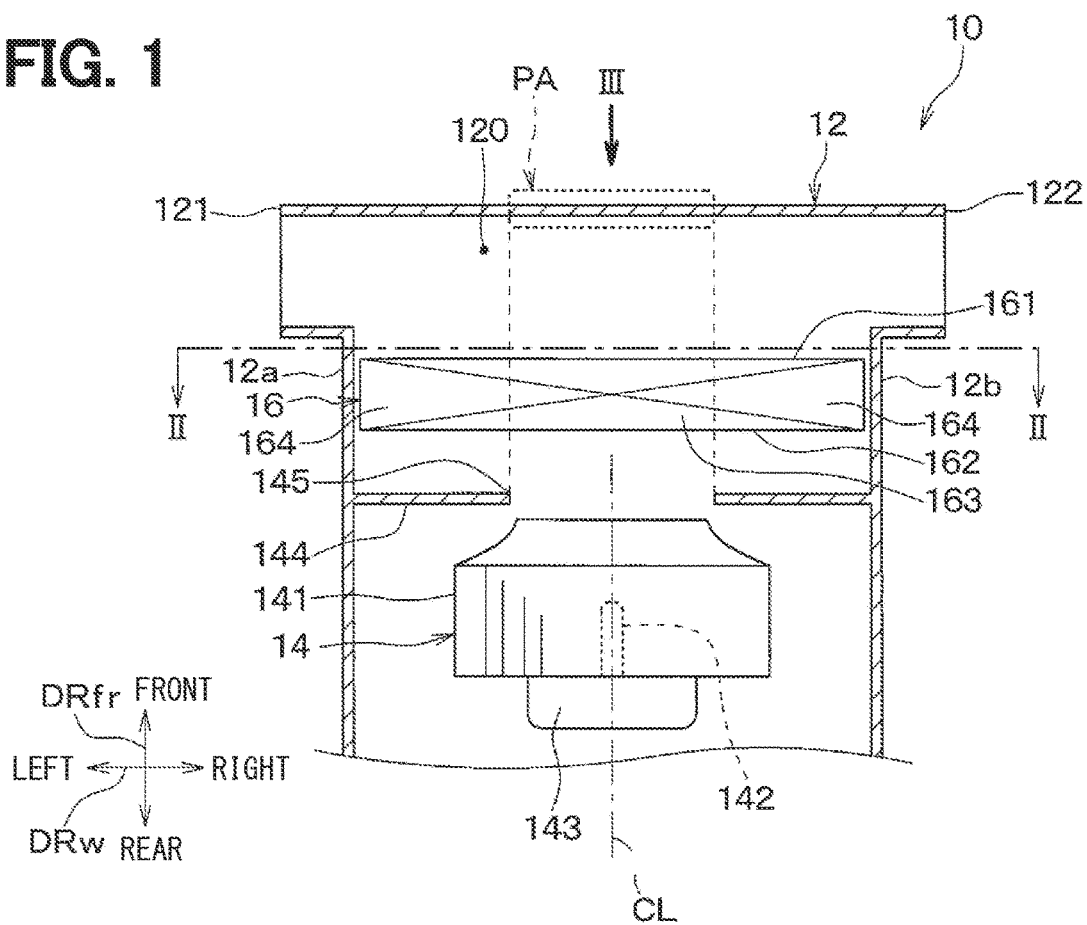
FIG. 1 is a schematic view of an air-conditioning unit in a first embodiment.

To begin with, examples of relevant techniques will be described.

An air-conditioning unit for a vehicle in which an evaporator serving as a cooling heat exchanger is disposed at a position upstream of a blower in an airflow direction in an air-conditioning case has been known. In the air-conditioning unit, the cooling heat exchanger and the blower face each other and the air-conditioning case defines multiple introducing openings through which air is introduced toward the cooling heat exchanger in an upper portion of the air-conditioning case.

When a velocity distribution of the air passing through the cooling heat exchanger is uneven, the cooling heat exchanger may not cool the air to an appropriate temperature or a part of the cooling heat exchanger may freeze. These are not preferable because they may cause a deterioration of air-conditioning performance of the air-conditioning unit.

Inventers of the present disclosure study a velocity distribution of air in the cooling heat exchanger of the air-conditioning unit in which the cooling heat exchanger and the blower face each other and in which the multiple introducing openings are defined in an upper portion of the air-conditioning case.

As a result, the inventers found that a difference of the velocity in the cooling heat exchanger occurred between a facing portion that overlaps with a suction opening of the blower and a non-facing portion that does not overlap with the suction opening of the blower. This is because air is likely to flow toward the facing portion that overlaps with the suction opening of the blower. In addition, a difference of the velocity occurs in the non-facing portion between a portion of the non-facing portion close to the multiple introducing openings and a portion of the non-facing portion apart from the multiple introducing openings.

It is objective of this disclosure to equalize a velocity of air passing through a cooling heat exchanger in an air-conditioning unit in which the cooling heat exchanger is disposed at a position upstream of a blower in an airflow direction.

According to an aspect of the present disclosure, an air-conditioning unit for a vehicle includes an air-conditioning case, a blower, and a cooling heat exchanger. The air-conditioning case defines an air passage for an air to be blown into a vehicle cabin. The blower is housed in the air-conditioning case. The cooling heat exchanger is disposed in the air-conditioning case at a position upstream of the blower in an airflow direction and configured to cool the air to be blown into the vehicle cabin. The blower includes a rotational shaft and a suction opening through which the air is sucked into the blower in an axial direction of the rotational shaft. The suction opening faces the cooling heat exchanger in the axial direction. The cooling heat exchanger includes a facing portion that overlaps with the suction opening in the axial direction and a non-facing portion that does not overlap with the suction opening in the axial direction. The facing portion is surrounded by the non-facing portion. The air-conditioning case includes a projected region that is virtually formed by projecting the facing portion toward an upstream side of the air-conditioning case along the axial direction. The air-conditioning case defines multiple introducing openings at positions outside of the projected region. At least a first one of the multiple introducing openings is defined on a side of the projected region opposite to at least a second one of the multiple introducing openings other than the at least first one of the multiple introducing openings.

The air-conditioning unit of the present disclosure defines multiple introducing openings at positions of the air-conditioning case that is outside of a portion overlapping with the suction opening of the blower (i.e., the projected region). Accordingly, the air introduced into the air-conditioning case through the multiple introducing openings is restricted from biasedly flowing toward the facing portion of the cooling heat exchanger that overlaps with the suction opening of the blower. That is, the air-conditioning unit in this disclosure can reduce a difference of the velocity of air in the cooling heat exchanger between the facing portion that overlaps with the suction opening and the non-facing portion that does not overlap with the non-facing portion.

In addition, in the air-conditioning unit in this embodiment, at least a first one of the multiple introducing openings is located on a side of the projected region, on which the cooling heat exchanger is projected, opposite to at least a second one of the multiple introducing openings other than the at least the first one of the multiple introducing openings. Accordingly, the non-facing portion of the cooling heat exchanger is located close to at least either one of the at least the first one of the introducing openings and the at least the second one of the introducing openings, so that a difference of the velocity caused by a positional relationship between the non-facing portion and the introducing openings is restricted from generating.

According to the air-conditioning unit of this disclosure in which the cooling heat exchanger is disposed at a position upstream of the blower in the airflow direction, the velocity distribution of the air passing through the cooling heat exchanger is equalized.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The respective embodiments described herein may be partially combined with each other as long as no particular problems are caused even without explicit statement of these combinations.

First Embodiment

An air-conditioning unit 10 for a vehicle in this embodiment will be described with reference to FIGS. 1 through 7. The air-conditioning unit 10 is configured to condition an air in a vehicle cabin by providing conditioned air into the vehicle cabin. Hereinafter, a height direction of the air-conditioning unit 10 is referred to as an up-down direction DRud. A width direction of the air-conditioning unit 10 is referred to as a right-left direction DRw and a depth direction is referred to as a front-rear direction DRfr. The up-down direction DRud, the right left direction DRw, and the front-rear direction DRfr correspond respectively to an up-down, a right-left, and a front-rear side of the vehicle when the air-conditioning unit 10 is installed in the vehicle.

The air-conditioning unit 10 is disposed inside of an instrument panel that is located in a front portion of the vehicle cabin. As shown in FIG. 1, the air-conditioning unit 10 includes an air-conditioning case 12, a blower 14, and a cooling heat exchanger 16.

The air-conditioning case 12 forms an outer frame of the air-conditioning unit 10. The air-conditioning case 12 defines therein an air passage 120 for air to be blown into the vehicle cabin. The air-conditioning case 12 has a certain degree of elasticity and made of a resin superior in strength (e.g., polypropylene).

The air-conditioning case 12 houses the blower 14 configured to generate an airflow into the vehicle cabin and the cooling heat exchanger 16 configured to cool the air to be blown into the vehicle cabin. The air-conditioning case 12 also houses a heating heat exchanger configured to heat air and an air mix door configured to adjust a temperature of air to be blown into the vehicle cabin, which are not shown. The heating heat exchanger and the air mix door are located at a position downstream of the blower 14 in the airflow direction.

The blower 14 includes a fan 141, a rotational shaft 142 connected to the fan 141, and an electric motor 143 that drives to rotate the rotational shaft 142. The fan 141 is a centrifugal fan configured to blow air, which is sucked in an axial direction of the rotational shaft 142, radially outward. The axial direction is a direction in which an axial line CL of the rotational shaft 142 extends. The fan 141 is not limited to a centrifugal fan and may be an axial flow fan or a mixed flow fan each of which sucks air in the axial direction of the rotational shaft 142.

The air-conditioning case 12 includes a suction plate 144 between the fan 141 and the cooling heat exchanger 16. The suction plate 144 forms a part of the blower 14 and defines a suction opening 145 formed into a substantially circular shape. The suction opening 145 is an opening through which air in an upstream side of the suction plate 144 is sucked into the blower 14 in the axial direction of the rotational shaft 142.

The blower 14 is disposed in the air-conditioning case 12 at a position downstream of the cooling heat exchanger 16. The blower 14 is disposed such that the suction opening 145 faces an outflow surface 162 of the cooling heat exchanger 16 in the axial direction of the rotational shaft 142.

The cooling heat exchanger 16 is disposed entirely across the air passage 120 of the air-conditioning case 12 at a position upstream of the blower 14. The cooling heat exchanger 16 serves as a low-pressure side heat exchanger in a vapor-compression type refrigerant cycle. That is, the cooling heat exchanger 16 is configured to cool air flowing through the air passage 120 by exchanging heat between air and a low-temperature low-pressure refrigerant flowing in the cooling heat exchanger 16 and by evaporating the refrigerant.

The cooling heat exchanger 16 has a flat rectangular parallelepiped shape and has an inflow surface 161 through which air flows into the cooling heat exchanger 16 and the outflow surface 162 through which the air flows out of the cooling heat exchanger 16. The inflow surface 161 and the outflow surface 162 face each other. The cooling heat exchanger 16 is housed in the air-conditioning case 12 such that both the inflow surface 161 and the outflow surface 162 intersect the axial direction of the rotational shaft 142 of the blower 14.

The cooling heat exchanger 16 has a facing portion 163 that overlaps with the suction opening 145 in the axial direction of the rotational shaft 142 and a non-facing portion 164 that does not overlap with the suction opening 145 in the axial direction of the rotational shaft 142.

Figure 2:
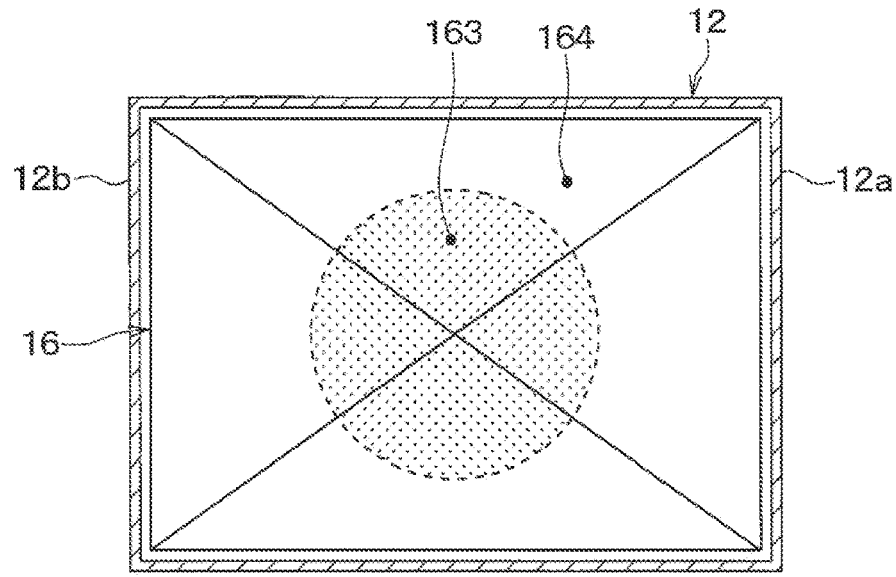
FIG. 2 is a cross-sectional view taken along a line II-II of FIG. 1.

As shown in FIG. 2, the cooling heat exchanger 16 is disposed such that the facing portion 163 is surrounded by the non-facing portion 164. The facing portion 163 is a region about a center of the cooling heat exchanger 16. The non-facing portion 164 is a region around the facing portion 163 in the cooling heat exchanger 16. In FIG. 2, the region of the facing portion 163 in the cooling heat exchanger 16 is hatched in a dot pattern.

With reference to FIG. 1, the air-conditioning case 12 defines multiple introducing openings at positions upstream of the cooling heat exchanger 16 in the airflow direction. The air is introduced into the air passage 120 from an outside of the air passage 120 through the multiple introducing openings. Specifically, the air-conditioning case 12 defines two introducing openings including a first introducing opening 121 and a second introducing opening 122.

Air can be introduced into the air passage 120 through both the first introducing opening 121 and the second introducing opening 122 at a same timing. The air-conditioning case 12 has both the first introducing opening 121 and the second introducing opening 122, so that it can be interpreted that the air-conditioning case 12 has redundant introducing openings. The first introducing opening 121 and the second introducing opening 122 can be referred to as redundant introducing openings in a sense of being distinguished from a selective type introducing openings that are not configured to introduce air at the same timing.

The first introducing opening 121 and the second introducing opening 122 are connected to an inside-outside switching chamber (not shown) to selectively introduce an inside air that is air inside the vehicle cabin and an outside air that is air outside the vehicle cabin. As a result, the air-conditioning case 12 is configured to introduce either one or both of the inside air and the outside air.

Figure 3:
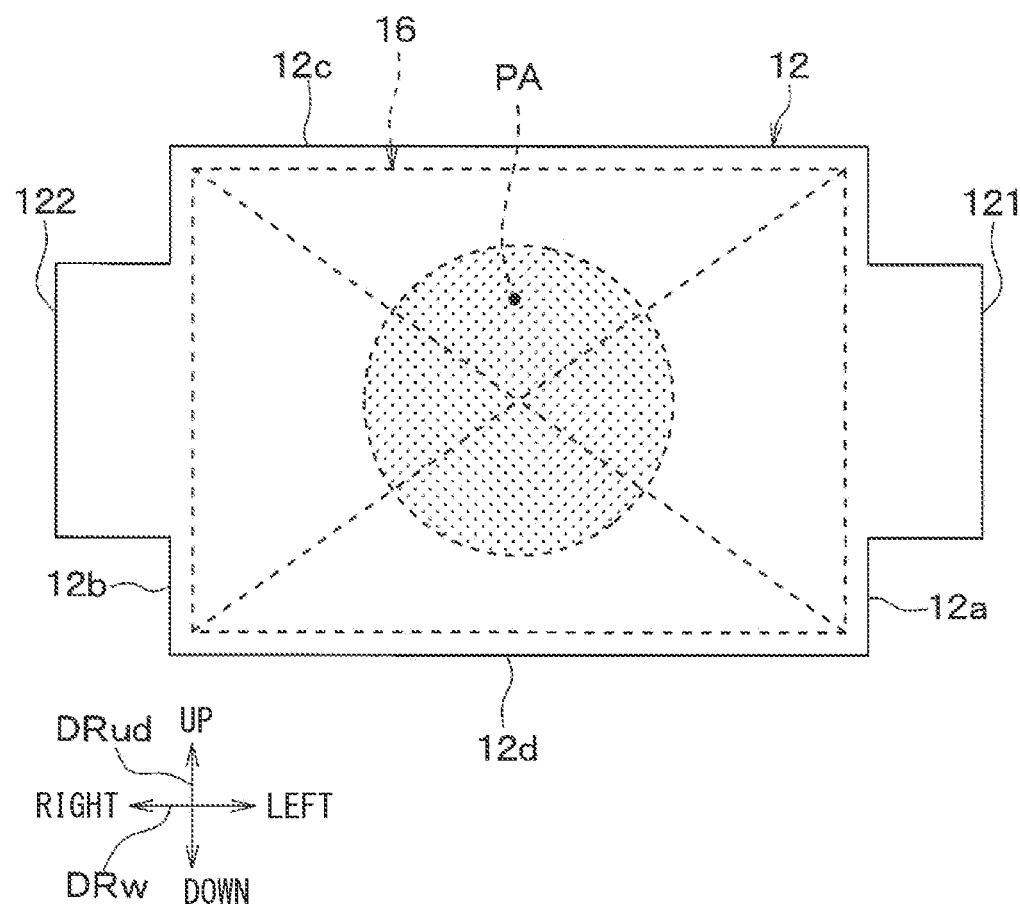
FIG. 3 is a schematic view of an air-conditioning case viewed in a direction of an arrow III in FIG. 1.

As shown in FIG. 3, the air-conditioning case 12 has a projected region PA at a portion of a front wall of the air-conditioning case 12. The projected region is virtually formed by projecting the facing portion 163 of the cooling heat exchanger 16 toward an upstream side of the air-conditioning case 12 along the axial direction of the rotational shaft 142. In FIG. 3, the projected region PA of the air-conditioning case 12 on which the facing portion 163 is projected is hatched in a dot pattern. This also applies to FIG. 13 which will be described later.

Each of the first introducing opening 121 and the second introducing opening 122 is defined at a position of the air-conditioning case 12 outside of the projected region PA. Specifically, the air-conditioning case 12 has a side surface 12a and a side surface 12b that face each other in the right-left direction DRw. The first introducing opening 121 is defined at the side surface 12a and the second introducing opening 122 is defined at the side surface 12b.

Further, the first introducing opening 121 is located in a side of the projected region opposite to the second introducing opening 122. That is, the projected region is located between the first introducing opening 121 and the second introducing opening 122 in the air-conditioning case 12.

Specifically, the first introducing opening 121 is defined at the side surface 12a of the air-conditioning case 12 and the second introducing opening 122 is defined at the side surface 12b of the air-conditioning case 12 such that the first introducing opening 121 face the second introducing opening 122 in the right-left direction DRw. That is, the first introducing opening 121 and the second introducing opening 122 are defined at a pair of the side surfaces 12a and 12b such that air is introduced along the inflow surface 161 of the cooling heat exchanger 16 and a direction in which air is introduced through the first introducing opening 121 is opposed to a direction in which air is introduced through the second introducing opening 122.

The air-conditioning case 12 houses the heating heat exchanger (not shown) at a position downstream of the blower 14. The heating heat exchanger is a heater core configured to heat air with a cooling water, as a heat source, for cooling a heat generator such as an internal combustion engine.

The air-conditioning case 12 defines a cool air bypass passage at a position downstream of the blower 14. The cool air bypass passage is a passage through which the air flowing out of the blower 14 bypasses the heating heat exchanger.

The air-conditioning case 12 has the air mix door (not shown) between the blower 14 and the heating heat exchanger. The air mix door is configured to adjust the temperature of air blown toward the vehicle cabin by adjusting a ratio of an amount of air passing through the heating heat exchanger to an amount of air flowing through the cool air bypass passage. The air-conditioning case 12 defines blowing openings such as a defroster opening, a face opening, a foot opening, and the like through which air is blown out toward the vehicle cabin.

Figure 4:
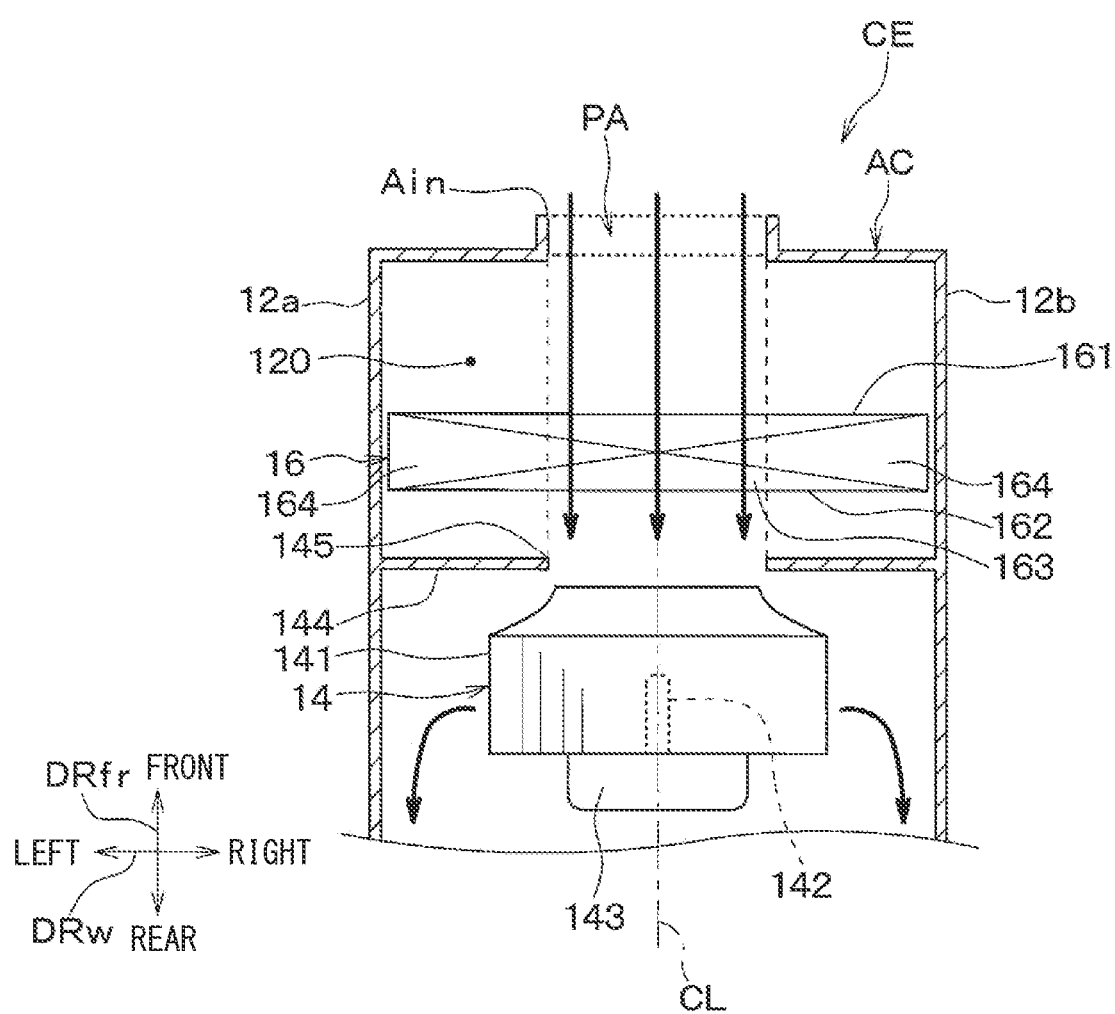
FIG. 4 is a schematic view of an air-conditioning unit in a comparative example of the first embodiment.

FIG. 4 is a schematic view of an air-conditioning unit CE in a comparative example. In the air-conditioning unit CE in the comparative example, an air-conditioning case AC defines an introducing opening Ain at a position different from a position of the introducing openings 121 and 122 of the air-conditioning unit 10 in this embodiment. The same reference numerals are given to configurations of the air-conditioning unit CE in the comparative example which are the same as those of the vehicle air-conditioning unit 10 of the present embodiment and descriptions thereof will be omitted.

As shown in FIG. 4, in the air-conditioning unit CE in the comparative example, the introducing opening Ain is defined in the projected region PA of the air-conditioning case AC on which the facing portion 163 of the cooling heat exchanger 16 is projected.

In the air-conditioning unit CE in the comparative example, when the fan 141 is rotated by the electric motor 143, the inside air or the outside air is introduced into the air passage 120 through the introducing opening Ain. The air having been introduced into the air passage 120 passes through the cooling heat exchanger 16 and then sucked by the fan 141 through the suction opening 145.

Figure 5:
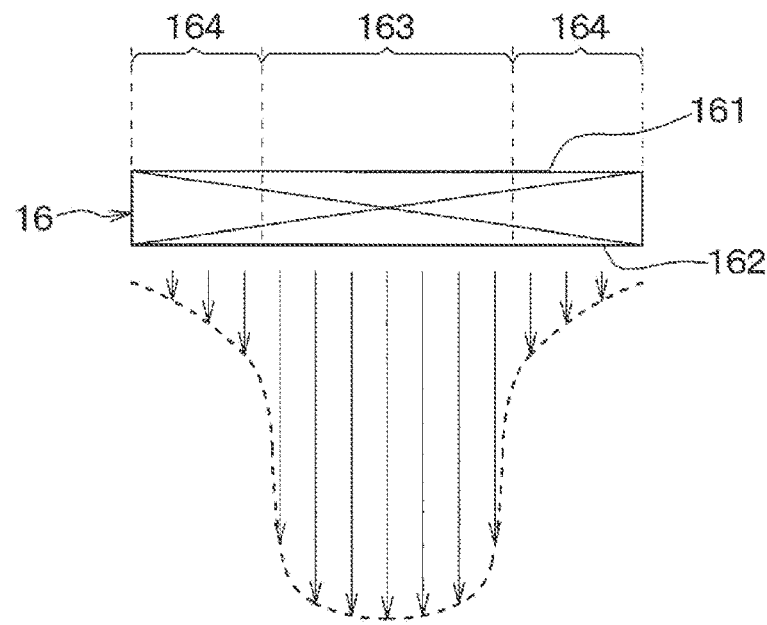
FIG. 5 is a schematic view illustrating a velocity distribution of air passing through a cooling heat exchanger of the air-conditioning unit in the comparative example of the first embodiment.

In this time, as shown in FIG. 5, the air flows mainly to the facing portion 163 of the cooling heat exchanger 16 that overlaps with the suction opening 145 and the air hardly flows to the non-facing portion 164 that does not overlap with the suction opening 145. That is, a velocity of air passing through the non-facing portion 164 that does not overlap with the suction opening 145 is extremely lower than a velocity of air passing through the facing portion 163 that overlaps with the suction opening 145.

When there is a variation in a velocity of air passing through the cooling heat exchanger 16, the cooling heat exchanger 16 may not be able to cool the air to an appropriate temperature and a part of the cooling heat exchanger 16 may freeze. These are not preferable because they may cause deterioration of the air-conditioning performance of the vehicle air-conditioning unit 10.

In contrast, in the air-conditioning unit 10 in this embodiment, when the fan 141 is rotated by the electric motor 143, the air having been introduced through both the first introducing opening 121 and the second introducing opening 122 passes through the cooling heat exchanger 16.

Figure 6:
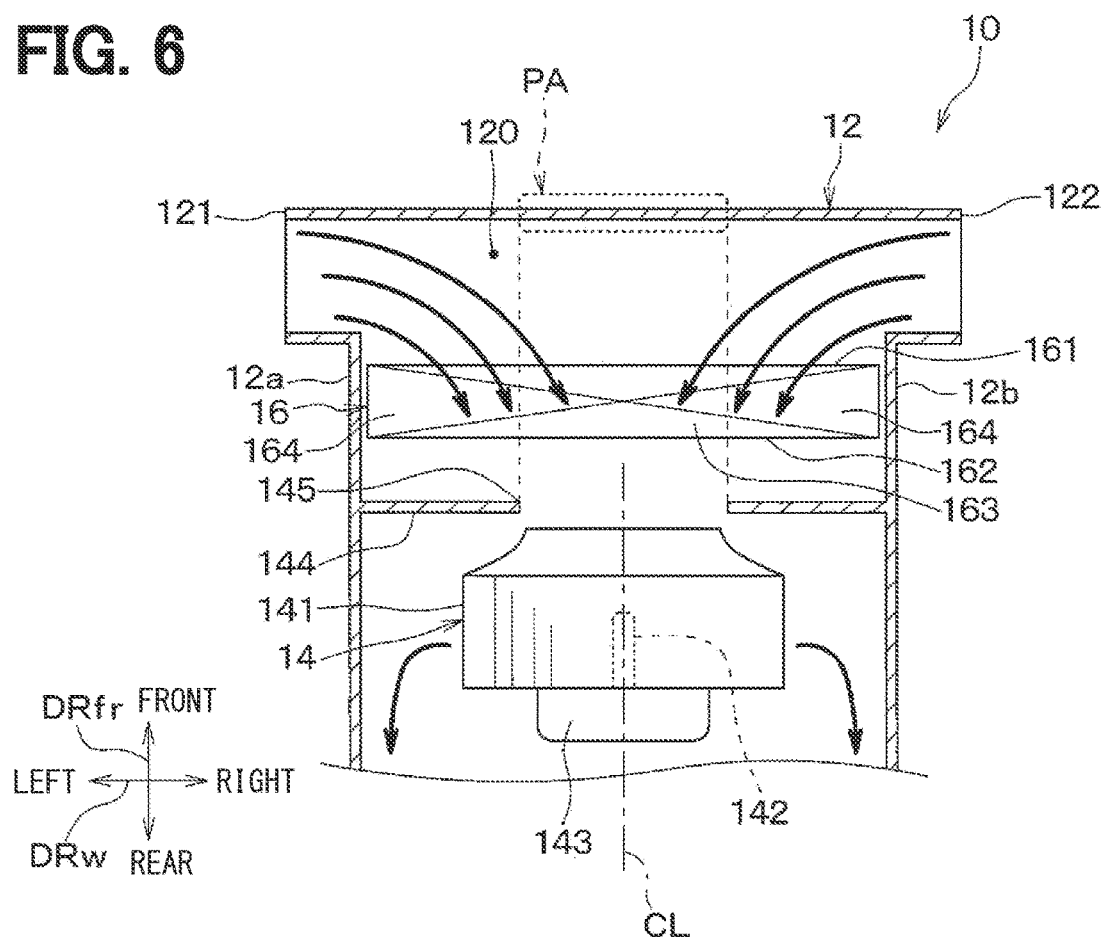
FIG. 6 is a schematic view illustrating an airflow in the air-conditioning case of the air-conditioning unit in the first embodiment.

In the air-conditioning unit 10 in this embodiment, the first introducing opening 121 and the second introducing opening 122 are defined at portions of the air-conditioning case 12 outside of the projected region PA on which the facing portion 163 of the cooling heat exchanger 16 is projected. That is, the first introducing opening 121 and the second introducing opening 122 are disposed closer to the non-facing portion 164 of the cooling heat exchanger 16 than the facing portion 163 of the cooling heat exchanger 16. Thus, as shown in FIG. 6, the air having been introduced through the first introducing opening 121 and the second introducing opening 122 is likely to flow not only to the facing portion 163 but also to the non-facing portion 164 of the cooling heat exchanger 16.

In addition, since the first introducing opening 121 and the second introducing opening 122 face each other with the projected region PA sandwiched therebetween, the non-facing portion 164 of the cooling heat exchanger 16 is located close to either one of the first introducing opening 121 and the second introducing opening 122. Thus, the variation of the velocity distribution caused by a positional relationship between the non-facing portion 164 of the cooling heat exchanger 16 and the introducing openings 121, 122 is restricted from being generated.

Figure 7:
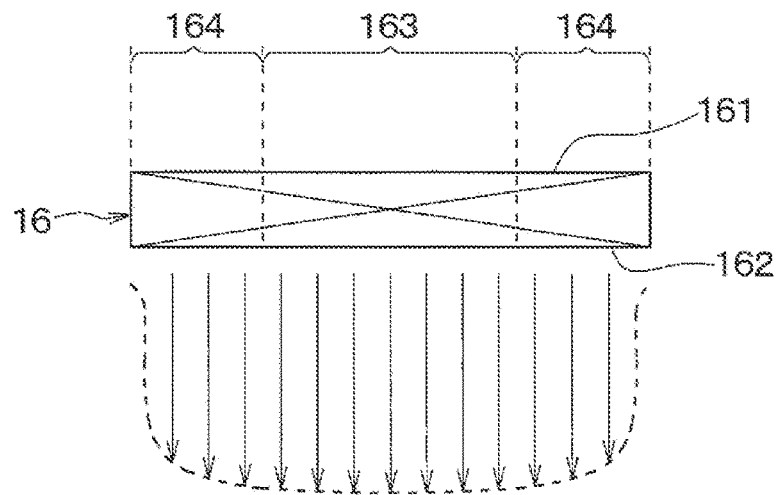
FIG. 7 is a schematic view illustrating a velocity distribution of air passing through the cooling heat exchanger of the air-conditioning unit in the first embodiment.

As shown in FIG. 7, the air flows not only to the facing portion 163 of the cooling heat exchanger 16 that overlaps with the suction opening 145 but also to the non-facing portion 164 of the cooling heat exchanger 16 that does not overlap with the suction opening 145. Thus, a difference of velocity can be reduced between air passing through the non-facing portion 164 of the cooling heat exchanger 16 that does not overlaps with the suction opening 145 and air passing through the facing portion 163 of the cooling heat exchanger 16 that overlaps with the suction opening 145.

As described above, the air-conditioning unit 10 in this embodiment can equalize a velocity distribution of air passing through the cooling heat exchanger 16 in a configuration in which the cooling heat exchanger 16 is disposed at a position upstream of the blower 14.

The air-conditioning unit 10 achieves to equalize the velocity distribution in the cooling heat exchanger 16 by changing positions of the air-conditioning case 12 at which the introducing openings are defined. Thus, the velocity distribution is equalized with a simple configuration compared to a configuration in which another member such as a wind direction plate is disposed. Additionally, since the air-conditioning unit 10 does not additionally include a member such as a wind direction plate, a pressure loss caused by the member such as the wind direction plate is not generated.

In a configuration in which air is introduced through multiple introducing openings, an amount of air flowing toward the cooling heat exchanger 16 through each of the multiple introducing openings is reduced compared to a configuration in which an air is introduced through a single introducing opening when a same amount of air is set to pass through the cooling heat exchanger 16. A pressure loss in the air passage 120 increases as an amount of air increases. Thus, in the configuration in which air is introduced through multiple introducing openings, a pressure loss in a passage from introducing openings to the cooling heat exchanger 16 can be reduced compared to the configuration in which air is introduced through the single introducing opening (First Modification of the First Embodiment)

In the above described first embodiment, the first introducing opening 121 and the second introducing opening 122 are defined at the pair of the side surfaces 12a and 12b of the air-conditioning case 12 such that the first introducing opening 121 and the second introducing opening 122 face each other in the right-left direction DRw. However, the present disclosure is not limited to this. The first introducing opening 121 and the second introducing opening 122 may be defined other positions while the first introducing opening 121 is located in a side of the projected region PA opposite to the second introducing opening 122.

(First Modification)

Figure 8:
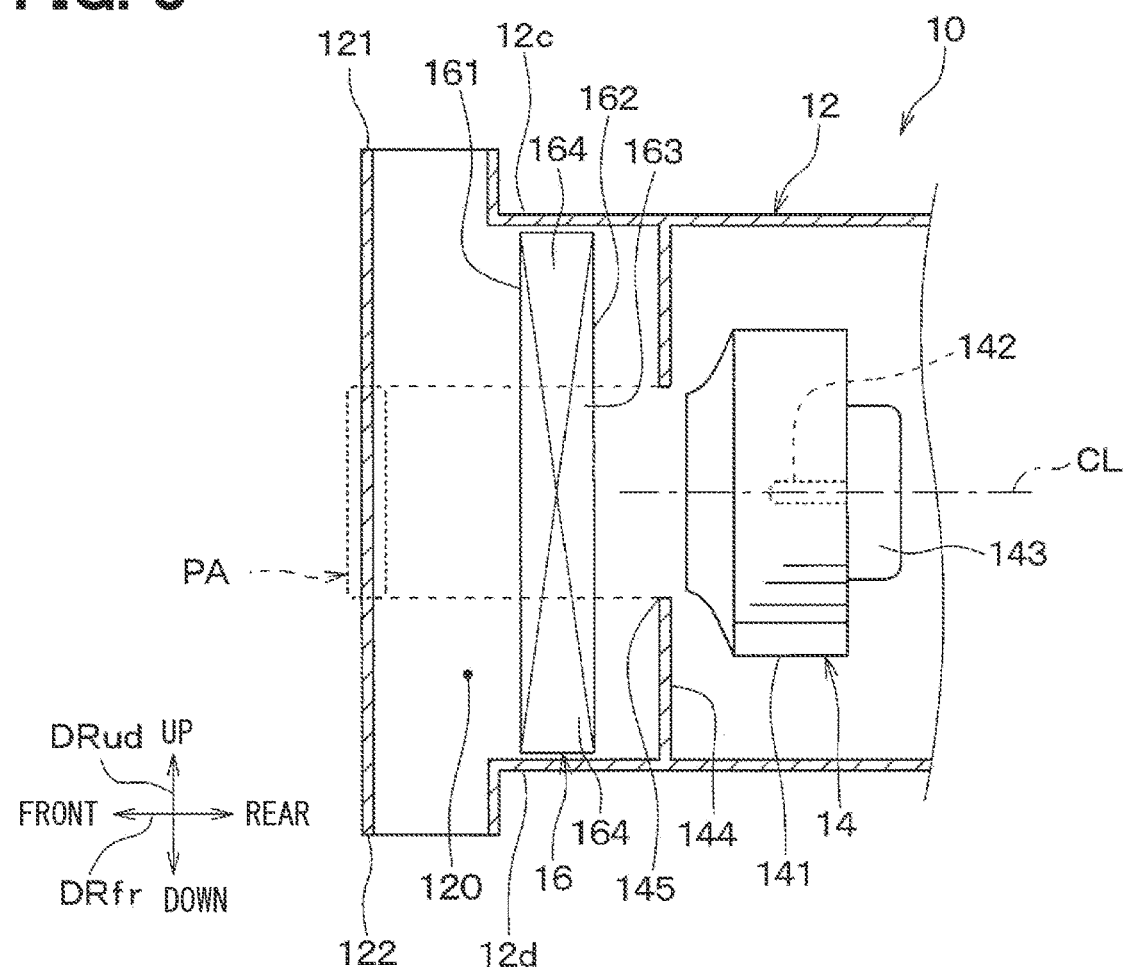
FIG. 8 is a schematic view of an air-conditioning unit in a first modification of the first embodiment.

As shown in FIG. 8, the first introducing opening 121 and the second introducing opening 122 may be defined respectively at an upper surface 12c and a lower surface 12d of the air-conditioning case 12 such that the first introducing opening 121 face the second introducing opening 122 in the up-down direction DRud.

(Second Modification)

Figure 9:
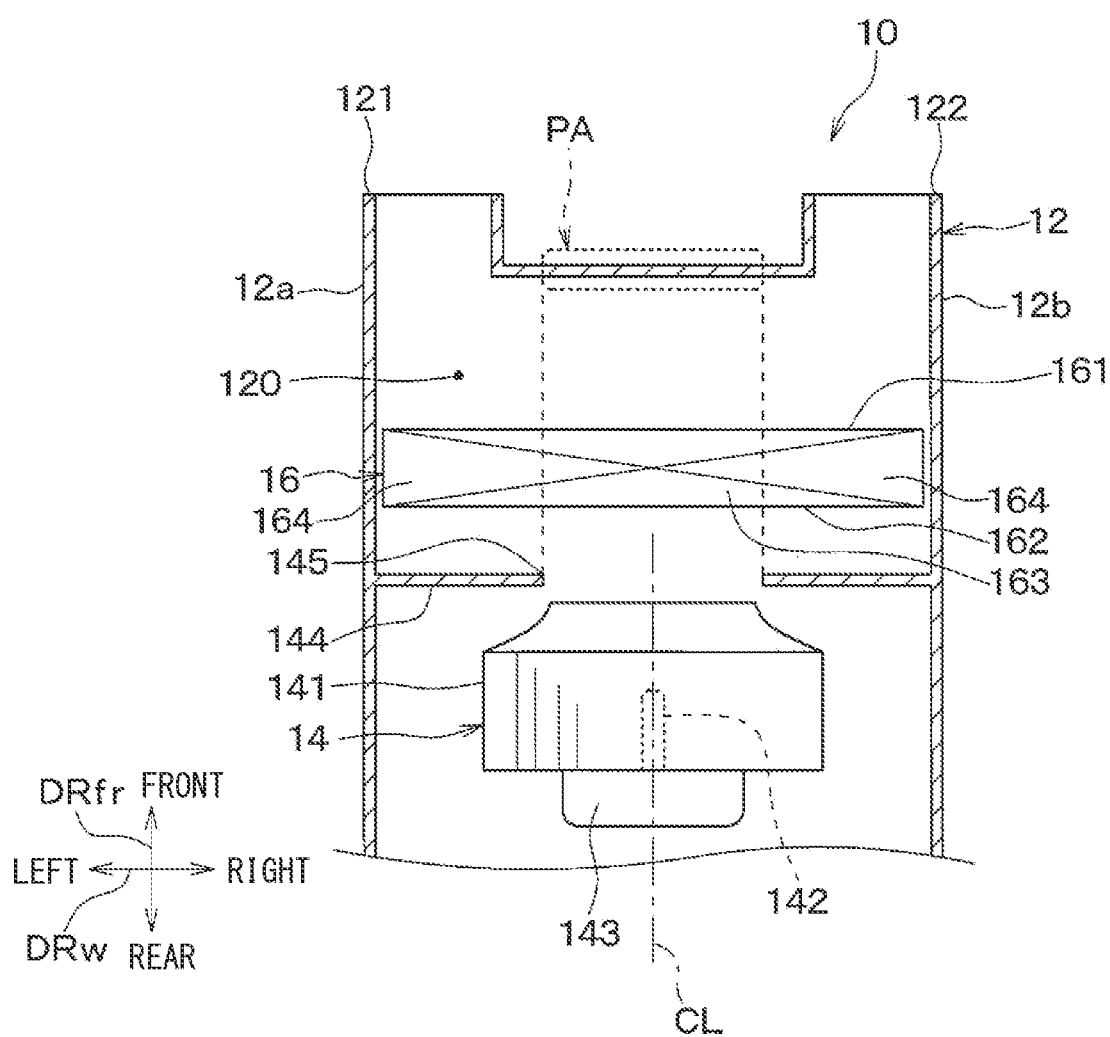
FIG. 9 is a schematic view of an air-conditioning unit in a second modification of the first embodiment.

As shown in FIG. 9, the first introducing opening 121 and the second introducing opening 122 may be defined at the air-conditioning case 12 such that the first introducing opening 121 and the second introducing opening 122 does not face each other but overlaps with the non-facing portion 164.

(Third Modification)

Figure 10:
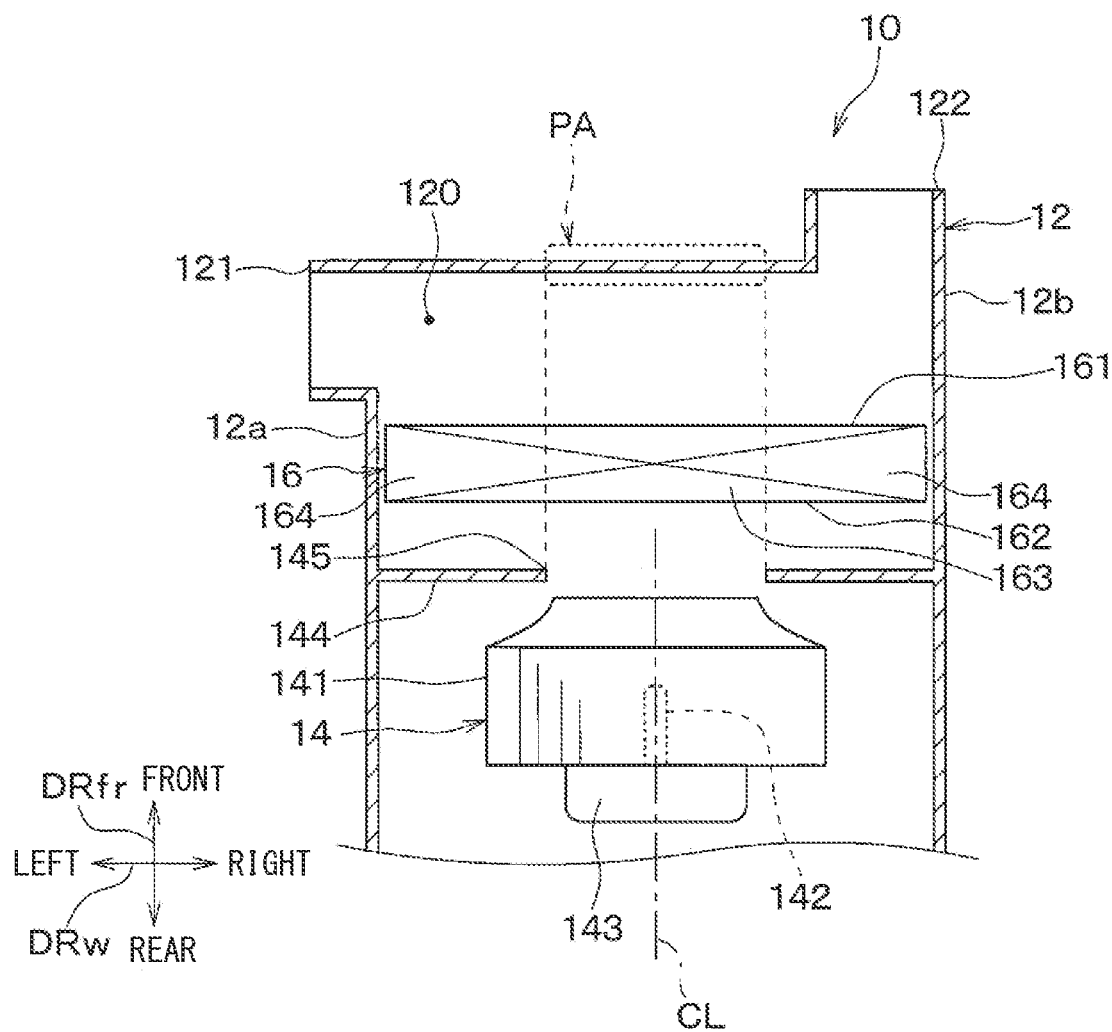
FIG. 10 is a schematic view of an air-conditioning unit in a third modification of the first embodiment.

As shown in FIG. 10, the first introducing opening 121 and the second introducing opening 122 may be defined at the air-conditioning case 12 such that one of the first introducing opening 121 and the second introducing opening 122 does not face the cooling heat exchanger 16 and the other one of the first introducing opening 121 and the second introducing opening 122 faces the non-facing portion 164 of the cooling heat exchanger 16.

(Fourth Modification)

Figure 11:
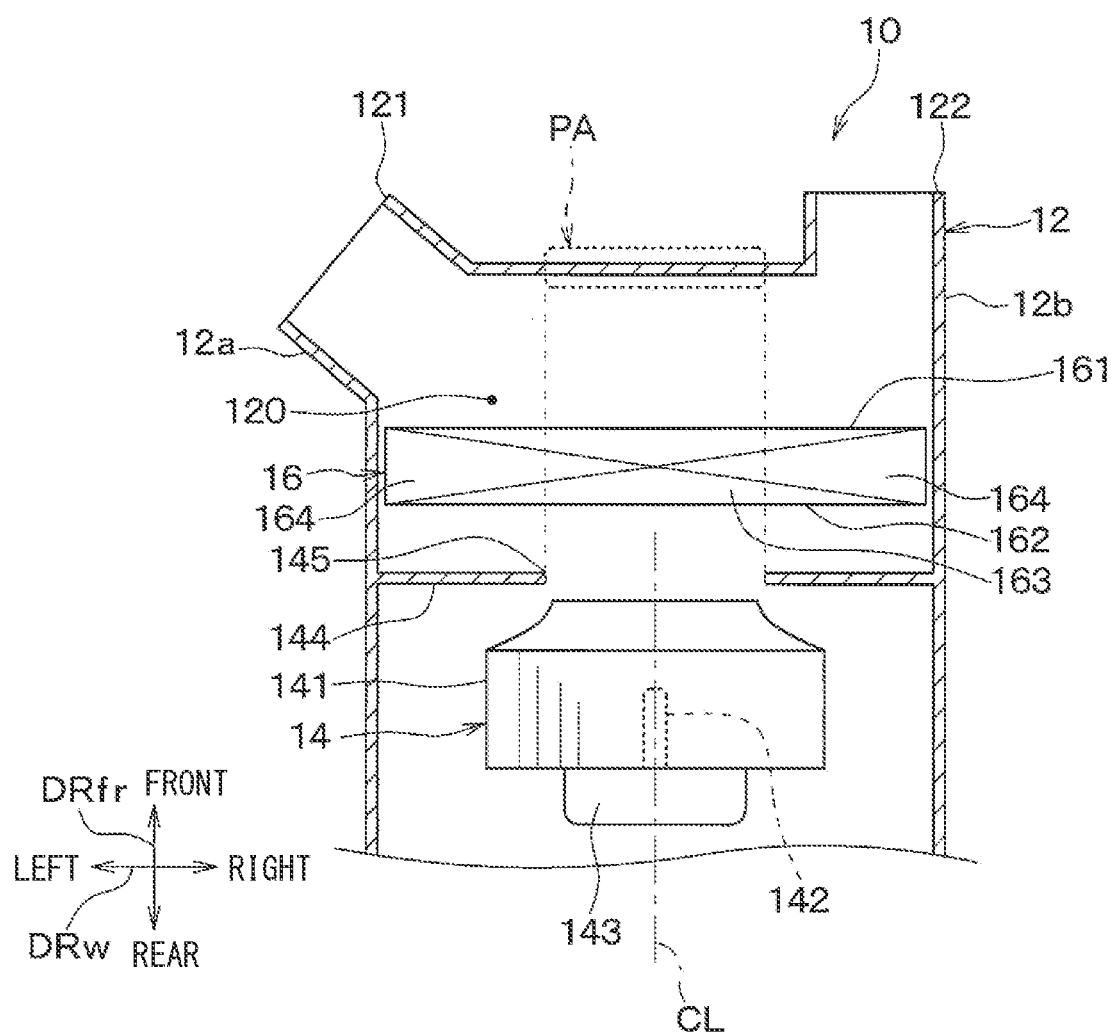
FIG. 11 is a schematic view of an air-conditioning unit in a fourth modification of the first embodiment.

As shown in FIG. 11, the first introducing opening 121 and the second introducing opening 122 may be defined at the air-conditioning case 12 such that one of the first introducing opening 121 and the second introducing opening 122 face in a direction intersecting the inflow surface 161 of the cooling heat exchanger 16.

Second Embodiment

Next, a second embodiment will be described with reference to FIGS. 12 and 13. An air-conditioning unit 10 in this embodiment is different from the first embodiment at a shape of a portion 123 located in the projected region PA of the air-conditioning case 12. In this embodiment, different portions from the first embodiment will be mainly described and descriptions of similar portions with the first embodiment will be omitted.

Figure 12:
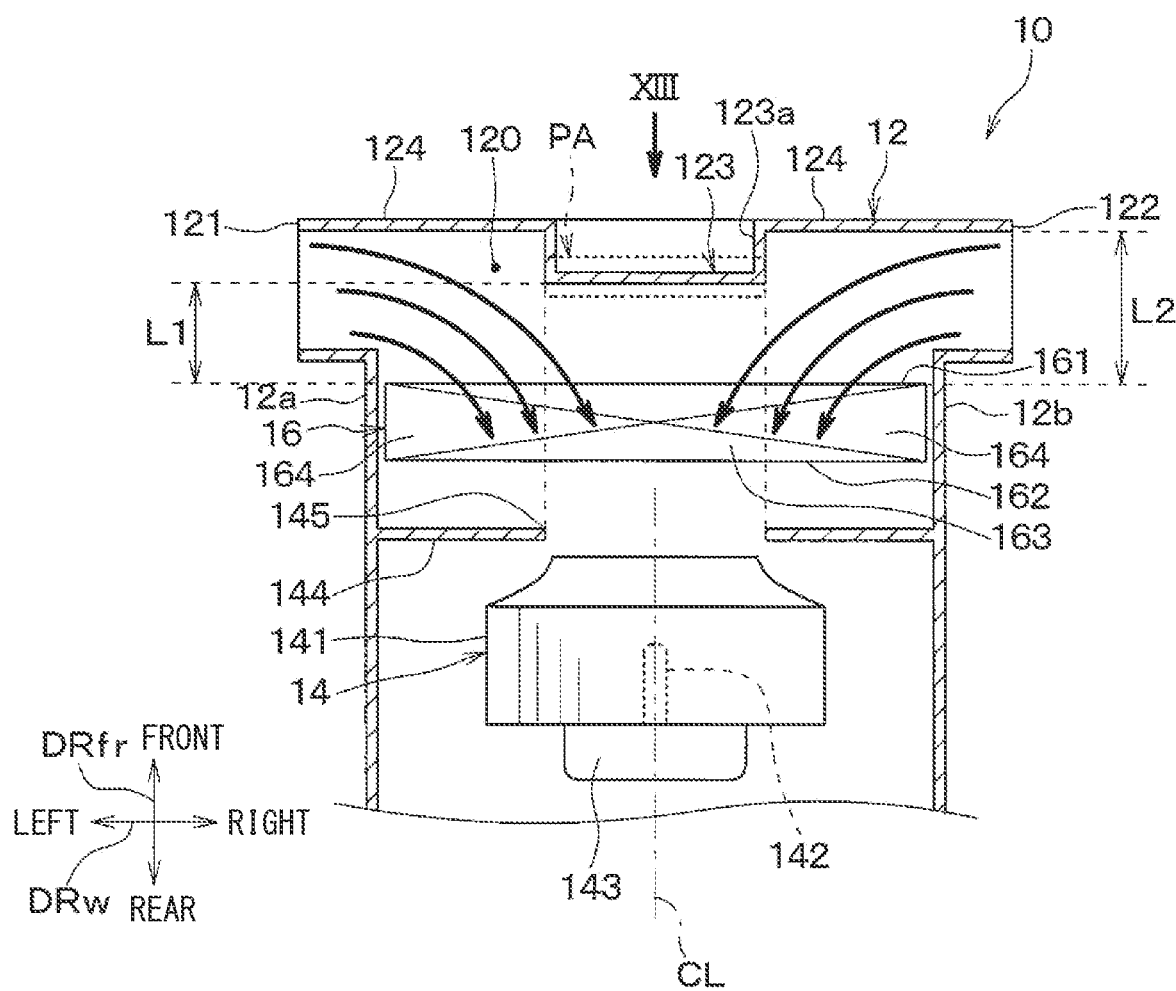
FIG. 12 is a schematic view of an air-conditioning unit in a second embodiment.
Figure 13:
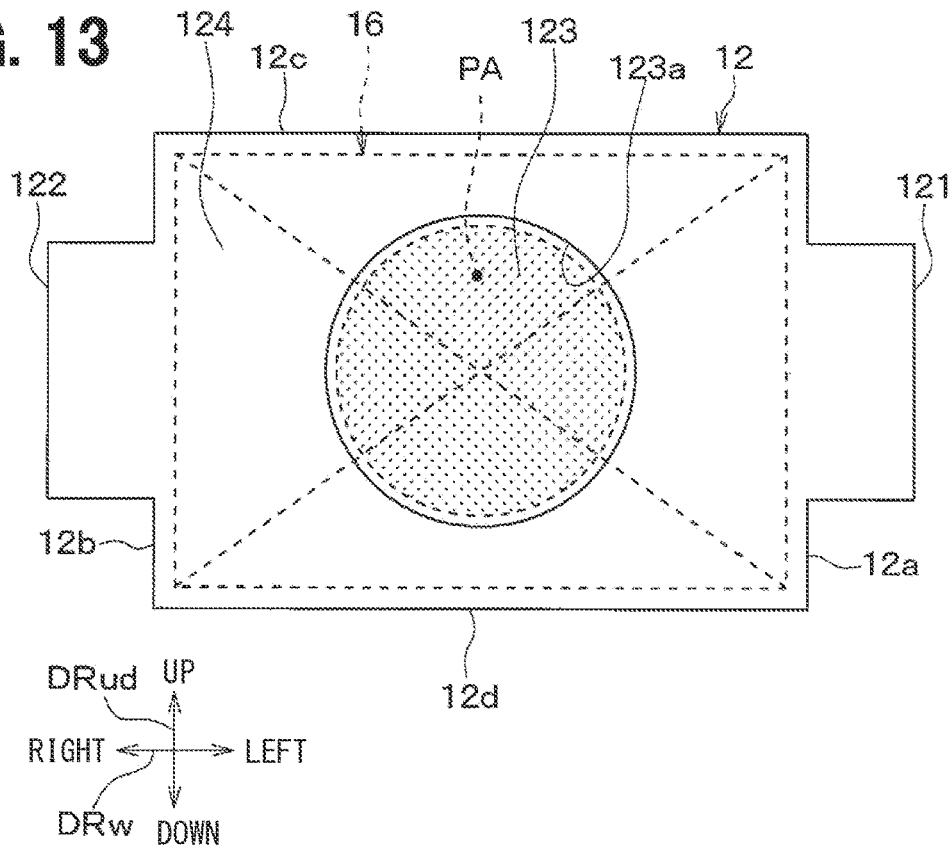
FIG. 13 is a schematic view of an air-conditioning case viewed in a direction of an arrow XIII in FIG. 12.

As shown in FIGS. 12 and 13, the portion 123 located in the projected region PA in the air-conditioning case 12 as a whole protrudes toward the cooling heat exchanger 16 to be close to the inflow surface 161 of the cooling heat exchanger 16. Specifically, the air-conditioning case 12 has a recess 123a at the portion 123 located in the projected region PA to position the portion 123 located in the projected region PA close to the inflow surface 161 of the cooling heat exchanger 16. Thus, in the air-conditioning case 12, a gap between the portion 123 located in the projected region PA and the inflow surface 161 of the cooling heat exchanger 16 is smaller than a gap between the inflow surface 161 and a portion 124 of the air-conditioning case 12 on which the non-facing portion 164 of the cooling heat exchanger 16 is projected. That is, a gap L1 between the portion 123 located in the projected region PA and the inflow surface 161 of the cooling heat exchanger 16 is smaller than a gap L2 between the portion 124 on which the non-facing portion 164 of the cooling heat exchanger 16 is projected and the inflow surface 161 of the cooling heat exchanger 16. The portion 123 protrudes from an inner surface of the air-conditioning case 12 toward the cooling heat exchanger 16.

When the gap L1 between the portion 123 located in the projected region PA and the inflow surface 161 of the cooling heat exchanger 16 is too small, air hardly flows toward the facing portion 163 of the cooling heat exchanger 16. Thus, the gap L1 between the portion 123 located in the projected region PA and the cooling heat exchanger 16 is set such that air can flow into the facing portion 163 of the cooling heat exchanger 16.

Other configurations are similar to the first embodiment. The air-conditioning unit 10 in this embodiment has a common configuration with the first embodiment. Thus, same advantages obtained from the common configuration with the first embodiment can be obtained in the second embodiment as with the first embodiment. The same also applies to the following embodiments.

Particularly, in the air-conditioning unit 10 in this embodiment, the portion 123 located in the projected region PA of the air-conditioning case 12 is located close to the inflow surface 161 of the cooling heat exchanger 16 compared to the portion 124 on which the non-facing portion 164 of the cooling heat exchanger 16 is projected.

As a result, a gap between an entire of the portion 123 that is the projected region PA of the air-conditioning case 12 and the cooling heat exchanger 16 becomes small. Thus, air having been introduced through the first introducing opening 121 and the second introducing opening 122 is sufficiently restricted from flowing mainly to the facing portion 163 of the cooling heat exchanger 16. In other words, since the gap between the portion 124 of the air-conditioning case 12 on which the non-facing portion 164 is projected and the cooling heat exchanger 16 becomes large, the air having been introduced through the first introducing opening 121 and the second introducing opening 122 is likely to flow into the non-facing portion 164 of the cooling heat exchanger 16. As a result, a difference of the velocity of air in the cooling heat exchanger 16 between the facing portion 163 and the non-facing portion 164 can be restricted from being generated.

(Modification of the Second Embodiment)

Figure 14:
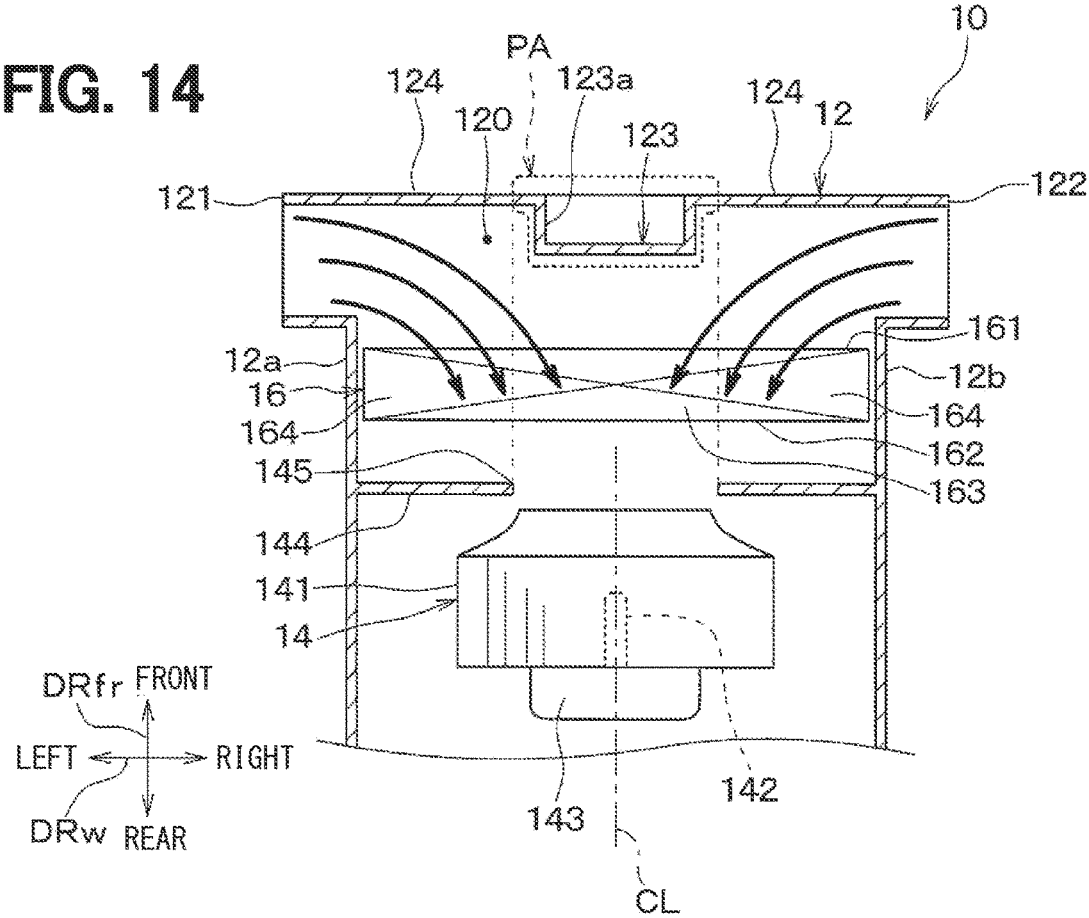
FIG. 14 is a schematic view of an air-conditioning unit in a modification of the second embodiment.

In the second embodiment described above, the distance between the entire of the portion 123 of the air-conditioning case 12 located in the projected region PA and the inflow surface 161 of the cooling heat exchanger 16 is small, but the present disclosure is not limited to this. As shown in FIG. 14, a part of the portion 123 located in the projected region PA may be located such that a gap between the part of the portion 123 and the inflow surface 161 of the cooling heat exchanger 16 is small. Thus, the air having been introduced through the first introducing opening 121 and the second introducing opening 122 is restricted from flowing mainly into the facing portion 163 of the cooling heat exchanger 16.

In the second embodiment described above, the gap L1 between the portion 123 located in the projected region PA and the inflow surface 161 of the cooling heat exchanger 16 is constant, but the present disclosure is not limited to this. The air-conditioning case 12 may be configured such that the gap L1 between the portion 123 located in the projected region PA and the inflow surface 161 of the cooling heat exchanger 16 is decreased stepwise or continuously toward a center of the projected region PA. Accordingly, a velocity distribution of air passing through the facing portion 163 of the cooling heat exchanger 16 is equalized.

Third Embodiment

Next, a third embodiment will be described with reference to FIGS. 15 and 16. An air-conditioning unit 10 in this embodiment differs from the first embodiment at a point that the portion 123 of the air-conditioning case 12 in the projected region PA includes a protrusion 18 protruding toward the cooling heat exchanger 16. In this embodiment, portions different from the first embodiment will be mainly described and descriptions of similar portions with the first embodiment are sometimes omitted.

Figure 15:
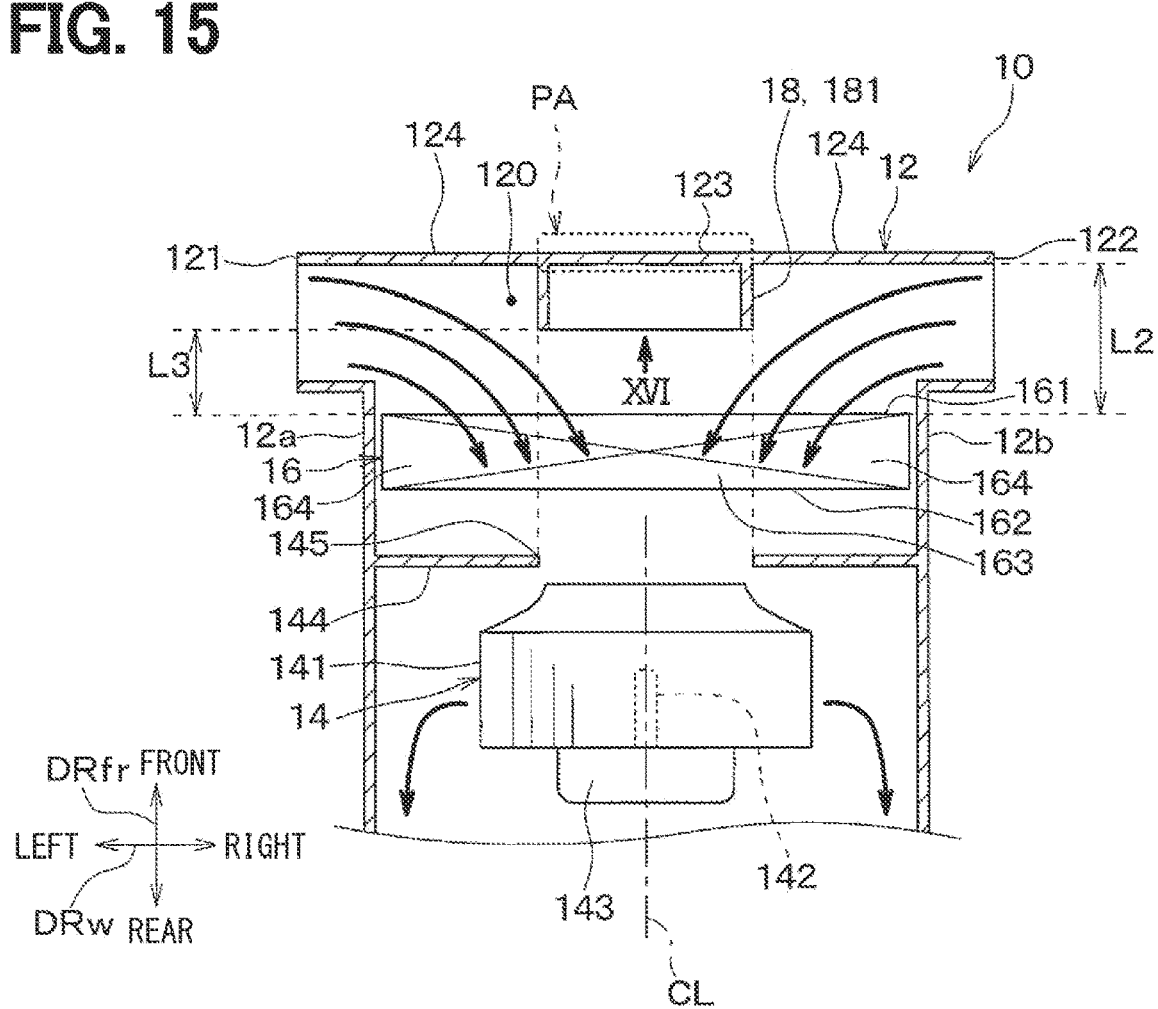
FIG. 15 is a schematic view of an air-conditioning unit in a third embodiment.

As shown in FIG. 15, the air-conditioning case 12 includes the protrusion 18 protruding from the portion 123 located in the projected region PA toward the inflow surface 161 of the cooling heat exchanger 16. As a result, the portion 123 of the projected region PA has a portion that defines a gap in the axial direction between the portion and the cooling heat exchanger 16 and a gap in the axial direction is defined between the cooling heat exchanger 16 and a region of the air-conditioning case 12 that is virtually formed by projecting the non-facing portion 164 toward an upstream side of the air-conditioning case. The gap between the portion and the cooling heat exchanger 16 is less than the gap between the cooling heat exchanger 16 and the region of the air-conditioning case 12. That is, a gap L3 between a tip end of the protrusion 18 located in the projected region PA and the inflow surface 161 of the cooling heat exchanger 16 is smaller than the gap L2 between the portion 124 on which the non-facing portion 164 of the cooling heat exchanger 16 is projected and the inflow surface 161 of the cooling heat exchanger 16.

When the gap L3 between the tip end of the protrusion 18 and the inflow surface 161 of the cooling heat exchanger 16 is too small, air is restricted from flowing toward the facing portion 163 of the cooling heat exchanger 16. Thus, the gap L3 is set within a range in which air can flow toward the facing portion 163 of the cooling heat exchanger 16.

Figure 16:
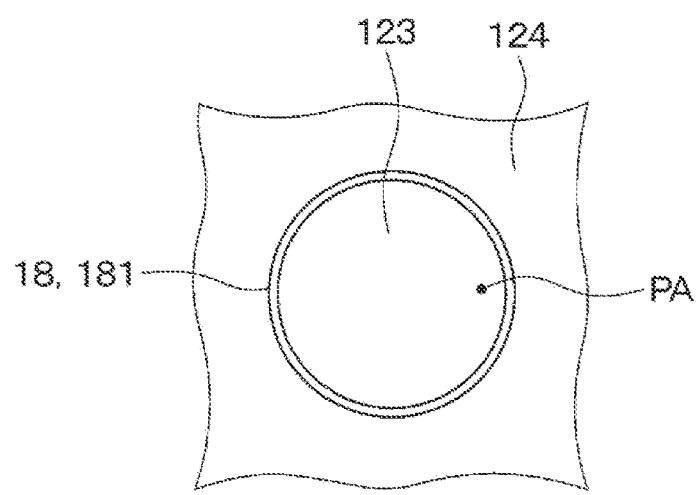
FIG. 16 is a schematic view of an air-conditioning case viewed in a direction of an arrow XVI in FIG. 15.

Specifically, as shown in FIG. 16, the protrusion 18 is a rib 181 having an annular shape and surrounding the projected region PA. The rib 181 annularly extends along an outer edge of the projected region PA to surround an entire of the projected region PA.

Other configurations are similar to the first embodiment. The air-conditioning unit 10 in this embodiment has the protrusion 18 protruding from the portion 123 of the air-conditioning case 12 located in the projected region PA toward the inflow surface 161 of the cooling heat exchanger 16. Thus, the protrusion 18 located in the air-conditioning case 12 restricts air having been introduced through the first introducing opening 121 and the second introducing opening 122 from flowing mainly toward the facing portion 163 of the cooling heat exchanger 16. As a result, a difference of velocity in the cooling heat exchanger 16 between the facing portion 163 and the non-facing portion 164 is restricted from being generated.

In particular, since the protrusion 18 is formed by the rib 181 having an annular shape and surrounding the portion 123 that is the projected region PA, air having been introduced through the first introducing opening 121 and the second introducing opening 122 is sufficiently restricted from flowing mainly toward the facing portion 163 of the cooling heat exchanger 16.

(Modifications of the Third Embodiment)

In the third embodiment described above, the protrusion 18 is formed by the rib 181 having an annular shape and surrounding the portion 123 located in the projected region PA, but the present disclosure is not limited to this.

(First Modification)

Figure 17:
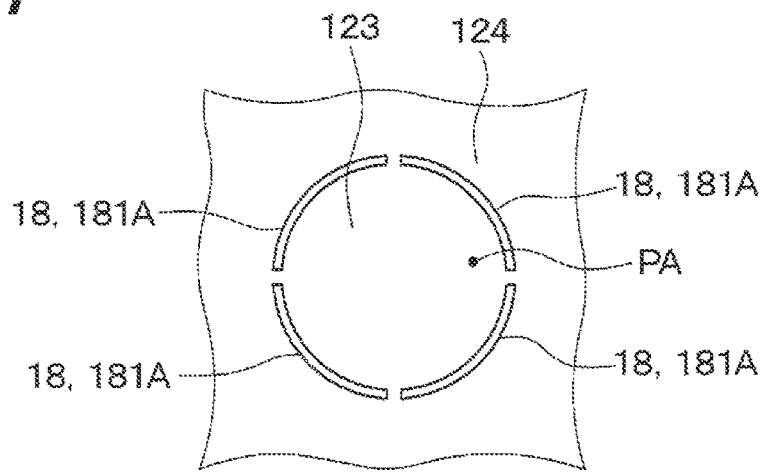
FIG. 17 is a schematic view illustrating a protrusion in a first modification of the third embodiment and corresponding to FIG. 16.

As shown in FIG. 17, the protrusion 18 may be formed by multiple ribs 181A arranged along the outer edge of the portion 123 located in the projected region PA.

(Second Modification)

Figure 18:
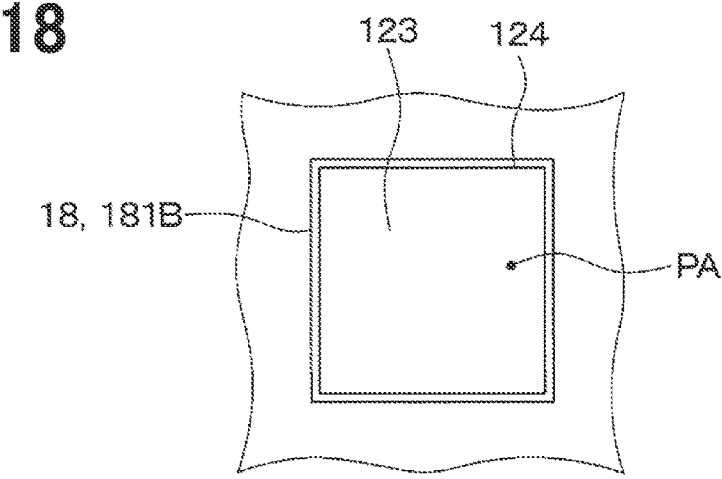
FIG. 18 is a schematic view illustrating a protrusion in a second modification of the third embodiment and corresponding to FIG. 16.

As shown in FIG. 18, the protrusion 18 may be formed by a rib 181B having a polygonal annular shape and surrounding the portion 123 located in the projected region PA.

(Third Modification)

Figure 19:
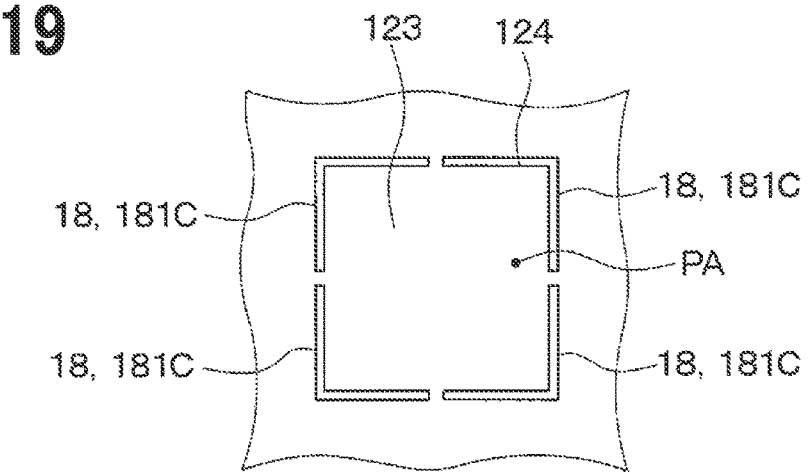
FIG. 19 is a schematic view illustrating a protrusion in a third modification of the third embodiment and corresponding to FIG. 16.

As shown in FIG. 19, the protrusion 18 may be formed by multiple L-shaped ribs 181C arranged to surround the portion 123 that is located in the projected region PA.

Fourth Embodiment

Next, a fourth embodiment will be described with reference to FIGS. 20 and 21. An air-conditioning unit 10 in this embodiment differs from the first embodiment at a point that the air-conditioning unit 10 in this embodiment has an opening-closing member 20 configured to selectively open and close the first introducing opening 121 and the second introducing opening 122. In this embodiment, different portions from the first embodiment will be mainly described and descriptions of similar portions with the first embodiment will be omitted.

Figure 20:
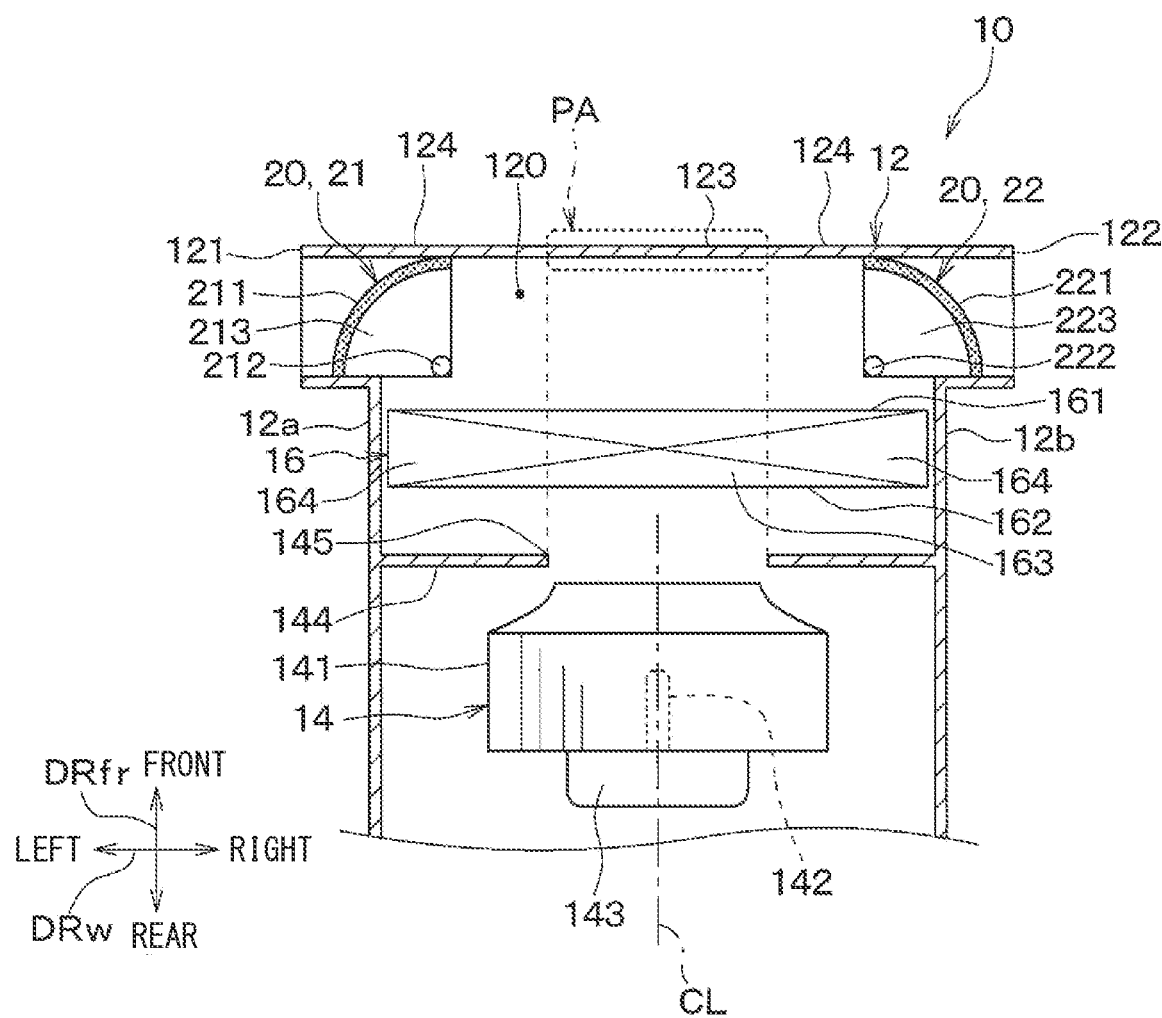
FIG. 20 is a schematic view of an air-conditioning unit in a fourth embodiment.

As shown in FIG. 20, the air-conditioning case 12 includes the opening-closing member 20 configured to selectively open and close the first introducing opening 121 and the second introducing opening 122. The opening-closing member 20 is located at a position upstream of the cooling heat exchanger 16 in the airflow direction. The opening-closing member 20 includes a first opening-closing door 21 to selectively open and close the first introducing opening 121 and a second opening-closing door 22 to selectively open and close the second introducing opening 122.

The first opening-closing door 21 is constituted by a rotary door including a sealing portion 211 curved into a circular arc shape and a connecting plate 213 having a sector shape and connecting the sealing portion 211 to a door shaft 212. The second opening-closing door 22 is constituted by a rotary door including a sealing portion 221 curved into a circular arc shape and a connecting plate 223 having a sector shape and connecting the sealing portion 221 to a door shaft 222. The first opening-closing door 21 and the second opening-closing door 22 are supported in the air-conditioning case 12 such that the door shafts 212 and 222 are rotatable.

The first opening-closing door 21 and the second opening-closing door 22 serve as guide members that guide the air having been introduced through the first introducing opening 121 and the second introducing opening 122 to flow toward the non-facing portion 164 of the cooling heat exchanger 16 when the first opening door opens the first introducing opening 121 and the second opening door opens the second introducing opening 122.

Figure 21:
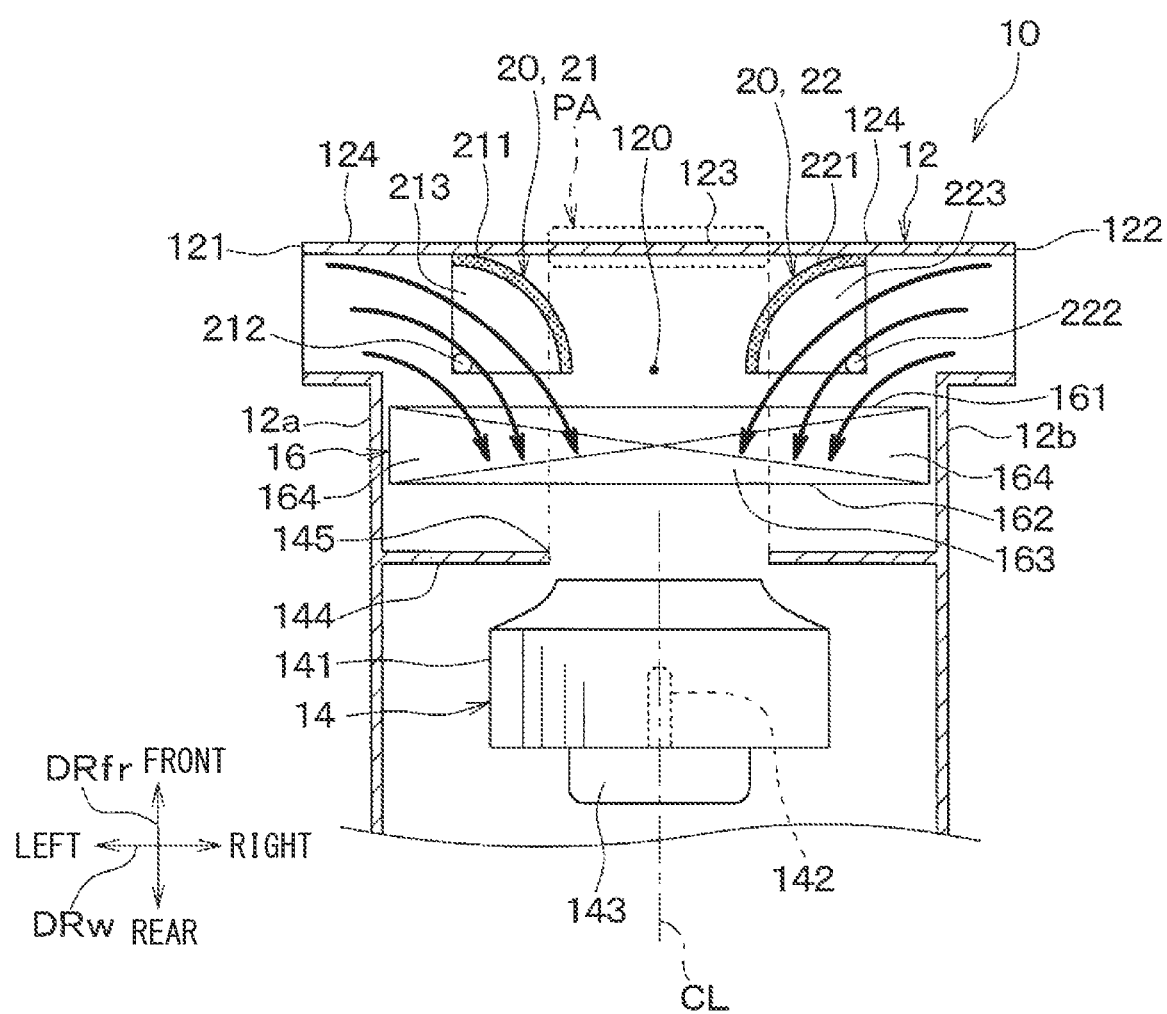
FIG. 21 is a schematic view illustrating an airflow in an air-conditioning case of the air-conditioning unit in the fourth embodiment.

As shown in FIG. 21, when the first opening-closing door 21 is positioned at an opening position at which the first opening-closing door 21 opens the first introducing opening 121, an inner wall of the sealing portion 211 serves as a guide wall guiding the air having been introduced through the first introducing opening 121 to flow toward the non-facing portion 164 of the cooling heat exchanger 16. Similarly, when the second opening-closing door 22 is positioned at an opening position at which the second opening-closing door 21 opens the second introducing opening 122, an inner wall of the sealing portion 221 serves as a guide wall guiding the air introduced through the second introducing opening 122 to flow toward the non-facing portion 164 of the cooling heat exchanger 16.

Other portions are similar to the first embodiment. When the air-conditioning unit 10 positions the opening-closing member 20 at the opening positions to open the first introducing opening 121 and the second introducing opening 122, the opening-closing member 20 serves as the guide member to guide the air having been introduced through the first introducing opening 121 and the second introducing opening 122 to flow toward the non-facing portion 164 of the cooling heat exchanger 16.

Accordingly, the opening-closing member 20 enables the air having been introduced through the first introducing opening 121 and the second introducing opening 122 to flow easily toward the non-facing portion 164 of the cooling heat exchanger 16. Specifically, the air-conditioning unit 10 in this embodiment can reduce the number of parts of the air-conditioning unit 10 compared to a case in which another member is added as a guide member. Additionally, it is not needed to secure a space in which the another member is disposed as a guide member, so that the air-conditioning unit 10 can be downsized.

(Modification of Fourth Embodiment)

Figure 22:
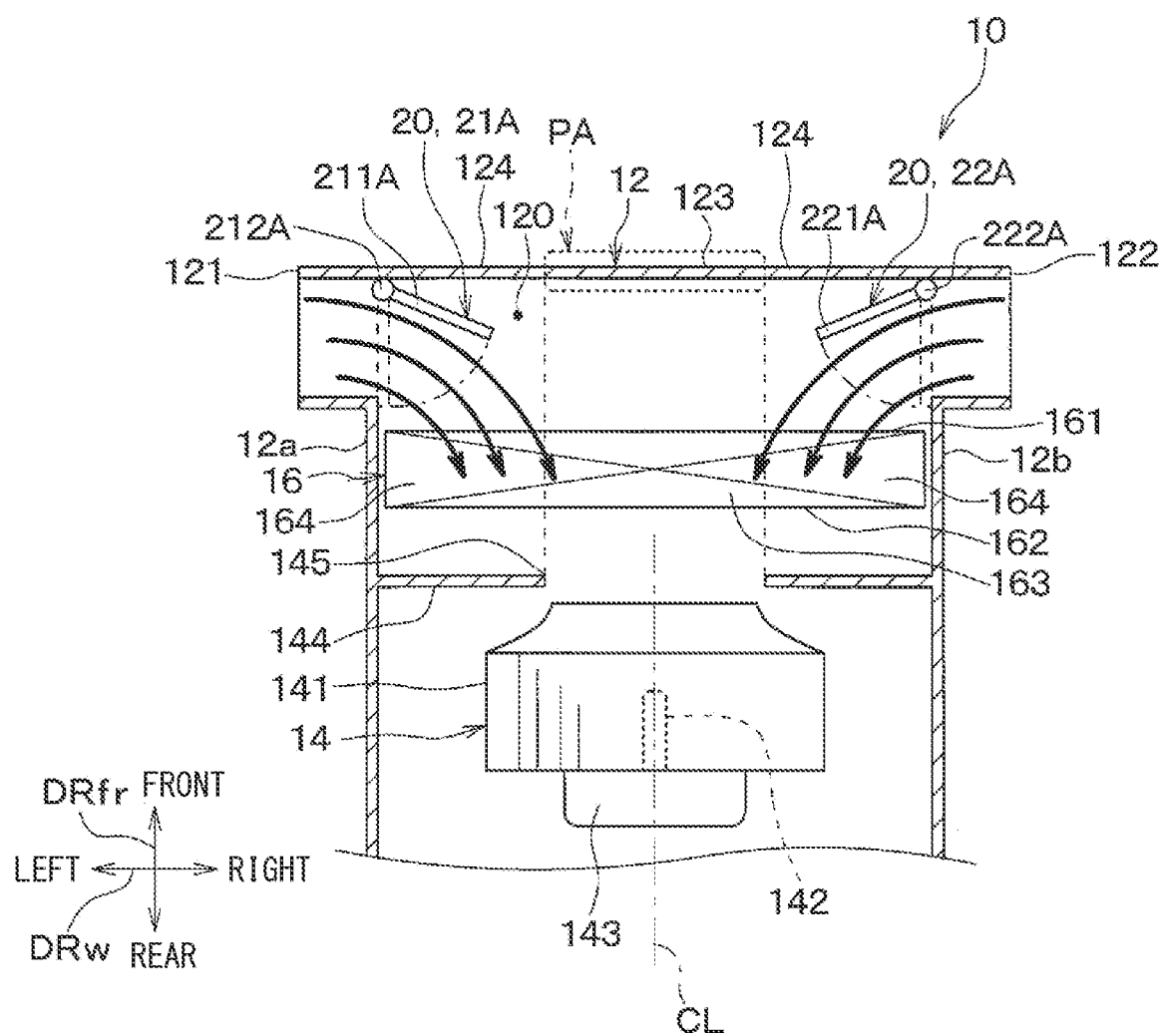
FIG. 22 is a schematic view of an air-conditioning unit in a modification of the fourth embodiment.

In the fourth embodiment described above, each of the first opening-closing door 21 and the second opening-closing door 22 that forms the opening-closing member 20 is a rotary door, but the present disclosure is not limited to this. As shown in FIG. 22, the opening-closing member 20 may be formed by a plate door in which a first opening-closing door 21A includes a plate 211A and a door shaft 212A and a second opening-closing door 22A includes a plate 221A and a door shaft 222A.

In the fourth embodiment described above, the first opening-closing door 21 is disposed for the first introducing opening 121 and the second opening-closing door 22 is disposed for the second introducing opening 122, but the present disclosure is not limited to this. The opening-closing member 20 may be formed by either one of the first opening-closing door 21 and the second opening-closing door 22.

In the fourth embodiment described above, the opening-closing member 20 is added to the air-conditioning unit 10 in the first embodiment, but the present disclosure is not limited to this. The air-conditioning unit 10 in this embodiment may be configured such that the opening-closing member 20 is added to the second embodiment or the third embodiment.

Fifth Embodiment

Next, a fifth embodiment will be described with reference to FIG. 23. An air-conditioning unit 10 in this embodiment differs from the first embodiment at a point that the air-conditioning unit 10 in this embodiment includes an air filter 24. In this embodiment, different portions from the first embodiment will be mainly described and descriptions of similar portions to the first embodiment will be omitted.

Figure 23:
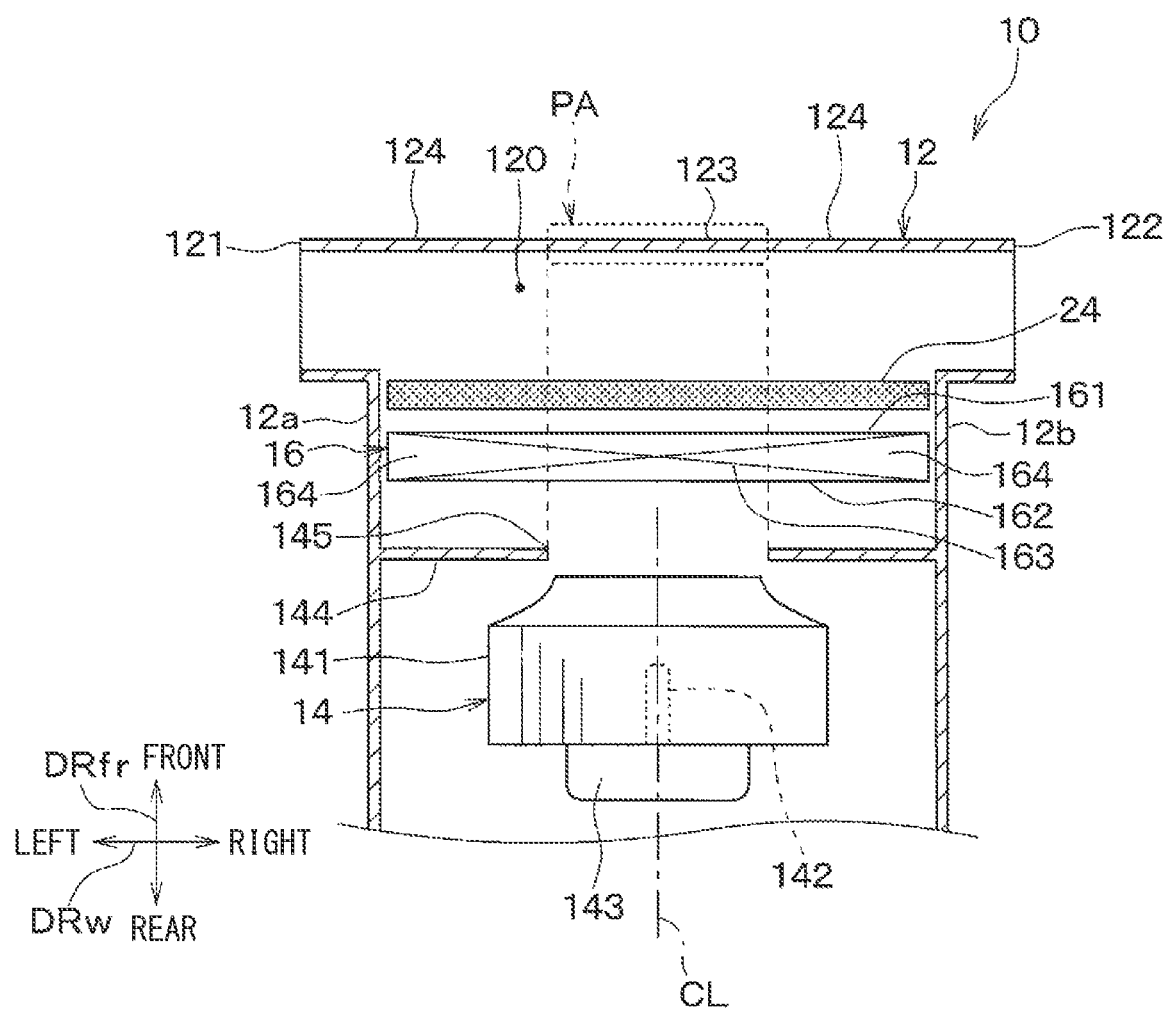
FIG. 23 is a schematic view of an air-conditioning unit in a fifth embodiment.

As shown in FIG. 23, the air-conditioning case 12 includes an air filter 24 at a position upstream of the cooling heat exchanger 16 in the airflow direction. The air filter 24 removes foreign matters such as dusts introduced through the first introducing opening 121 and the second introducing opening 122. The air filter 24 includes a filter element that has an air permeability in a predetermined direction.

Other configurations are similar to the first embodiment. In this embodiment, the air filter 24 is disposed at a position upstream of the cooling heat exchanger 16 in the airflow direction. Since the air filter 24 serves as a rectifying member to rectify a direction of air introduced into the cooling heat exchanger 16, a velocity distribution in air passing through the cooling heat exchanger 16 can be equalized.

In case that the air filter 24 is disposed at a position upstream of the cooling heat exchanger 16 in the airflow direction, the projected region PA of the air-conditioning case 12 is a region of the air-conditioning case 12 on which the facing portion 163 of the cooling heat exchanger 16 is projected without the air filter 24.

Other Embodiments

Although representative embodiments of the present disclosure have been described above, the present disclosure is not limited to the embodiments described above, and various modifications can be made, for example, as follows.

In the above embodiments, the air-conditioning case 12 defines multiple introducing openings that are the first introducing opening 121 and the second introducing opening 122 (i.e., the air-conditioning case 12 defines two redundant introducing openings), but the present disclosure is not limited to this. The air-conditioning case 12 may define more than three redundant introducing openings while at least first one of the redundant openings is located in a side of the projected region PA opposite to at least second one of the redundant openings other than the at least first one of the redundant openings.

The air-conditioning case 12 may define multiple inside air introducing openings through which the inside air is introduced into the air-conditioning case 12 as redundant introducing openings and multiple outside air introducing openings through which the outside air is introduced into the air-conditioning case 12 as redundant openings. In this case, it is preferable that at least a first one of the multiple inside air introducing openings is located in a side of the projected region PA opposite to at least a second one of the inside air introducing openings other than the at least the first one of the multiple inside air introducing openings. Similarly, it is preferable that at least the first one of the multiple outside air introducing openings is located in a side of the projected region PA opposite to at least the second one of the outside air introducing openings other than the at least the one of the multiple outside air introducing openings.

In the above described embodiment, the multiple introducing openings are located positions outside of the projected region PA of the air-conditioning case 12 and the multiple introducing openings are not located in the projected region PA, but the present disclosure is not limited to this. The projected region PA may also define an introducing opening while positions of the air-conditioning case 12 outside of the projected region PA also defines the multiple introducing openings.

In the above described embodiment, the inside outside air switching chamber is fluidly connected to both the first introducing opening 121 and the second introducing opening 122, but the present disclosure is not limited to this. The inside outside air switching chamber of the air-conditioning unit 10 may be fluidly connected to either one of the first introducing opening 121 and the second introducing opening 122. The air-conditioning unit 10 may be configured such that a duct through which air is introduced from an outside of the air-conditioning unit 10 into the air-conditioning unit 10 is fluidly connected to the first introducing opening 121 and the second introducing opening 122 instead of the inside outside switching chamber.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like, and the like.

(Overview)

In a first aspect described as a part or a whole of the above-described embodiments, an air-conditioning unit houses a cooling heat exchanger at a position upstream of a blower in an airflow direction inside the air-conditioning unit. The blower defines a suction opening through which the air is sucked into the blower in an axial direction of a rotational shaft of the blower and the suction opening faces the cooling heat exchanger in the axial direction. The cooling heat exchanger includes a facing portion that overlaps with the suction opening in the axial direction and a non-facing portion that does not overlap with the suction opening in the axial direction. The facing portion is surrounded by the non-facing portion. The air-conditioning case defines multiple introducing openings at positions outside of a projected region of the air-conditioning case that is virtually formed by projecting the facing portion toward an upstream side of the air-conditioning case in the axial direction. At least a first one of the multiple introducing openings is defined in a side of the projected region opposite to at least a second one of the multiple introducing openings other than the at least the first one of the multiple introducing openings.

According to a second aspect, the projected region of the air-conditioning case includes a portion that defines a gap in the axial direction between the portion and the cooling heat exchanger and a gap in the axial direction is defined between the cooling heat exchanger and a region of the air-conditioning case that is virtually formed by projecting the non-facing portion toward an upstream of the air-conditioning case. The gap between the portion and the cooling heat exchanger is less than the gap between the cooling heat exchanger and the region of the air-conditioning case.

Since a gap between the portion of the projected region of the air-conditioning case and the cooling heat exchanger becomes small, air having been introduced through the multiple introducing openings is restricted from flowing mainly toward the facing portion of the cooling heat exchanger that overlaps with the suction opening of the blower. In other words, since a gap between the region of the air-conditioning case on which the non-facing portion is projected and the cooling heat exchanger becomes large, the air having been introduced through the multiple introducing openings is likely to flow toward the non-facing portion of the cooling heat exchanger that does not overlap with the suction opening of the blower.

According to a third aspect, the air-conditioning case of the air-conditioning unit has a portion protruding from the projected region toward the cooling heat exchanger. Thus, a gap between the portion of the projected region of the air-conditioning case and the cooling heat exchanger becomes small.

According to a fourth aspect, in the air-conditioning case of the air-conditioning unit, the projected region as a whole protrudes toward the cooling heat exchanger. Since a gap in the axial direction between the projected region of the air-conditioning case and the cooling heat exchanger is small, the air having been introduced through the multiple introducing openings is restricted from flowing mainly toward the facing portion of the cooling heat exchanger that overlaps with the suction opening of the blower. As a result, a difference of velocity of air in the cooling heat exchanger between the facing portion and the non-facing portion that does not overlap with the suction opening is restricted from being generated.

According to a fifth aspect, the air-conditioning case of the air-conditioning unit includes a protrusion protruding from at least a part of the projected region toward the cooling heat exchanger. The protrusion disposed in the air-conditioning case restricts the air having been introduced through the multiple introducing openings from flowing mainly toward the facing portion of the cooling heat exchanger that overlaps with the suction opening of the blower. As a result, a difference of velocity of air in the cooling heat exchanger between the facing portion and the non-facing portion that does not overlap with the suction opening is restricted from being generated.

According to a sixth aspect, the protrusion is formed by a rib having an annular shape and surrounding the projected region. The rib that has an annular shape and is disposed in the air-conditioning case restricts the air having been introduced through the multiple introducing openings from flowing mainly to the facing portion of the cooling heat exchanger that overlaps with the suction opening of the blower. As a result, a difference between a velocity of air in the facing portion of the cooling heat exchanger that overlaps with the suction opening and a velocity of air in the non-facing portion of the cooling heat exchanger that does not overlap with the suction opening is sufficiently restricted from being generated.

According to a seventh aspect, the air-conditioning case of the air-conditioning unit includes an opening-closing member, at a position upstream of the cooling heat exchanger in an airflow direction, configured to selectively open and close at least one of the multiple introducing openings. The opening-closing member serves as a guide member that guides the air having been introduced through the at least one of the multiple introducing openings to flow toward the non-facing portion when the opening-closing member opens the at least one of the multiple introducing openings.

The opening-closing member enables the air having been introduced through the multiple introducing openings to flow easily toward the non-facing portion of the cooling heat exchanger that does not overlap with the suction opening of the blower. Specifically, the air-conditioning unit in this disclosure can reduce the number of parts compared to a case in which another member is added as a guide member. Additionally, it is no need to secure a space in which the another member is disposed as a guide member, so that the air-conditioning unit is restricted from increasing in size.

What is claimed is:

1. An air-conditioning unit for a vehicle configured to condition an air in a vehicle cabin, the air-conditioning unit comprising:
    an air-conditioning case defining an air passage for an air to be blown into the vehicle cabin;
    a blower housed in the air-conditioning case; and
    a cooling heat exchanger disposed in the air-conditioning case at a position upstream of the blower in an airflow direction, the cooling heat exchanger being configured to cool the air to be blown into the vehicle cabin, wherein
    the blower includes a rotational shaft and a suction opening through which the air is sucked into the blower in an axial direction of the rotational shaft, the suction opening facing the cooling heat exchanger in the axial direction,
    the cooling heat exchanger includes a facing portion that overlaps with the suction opening in the axial direction and a non-facing portion that does not overlap with the suction opening in the axial direction, the facing portion is surrounded by the non-facing portion, the air-conditioning case includes a projected region that is virtually formed by projecting the facing portion toward an upstream side of the air-conditioning case along the axial direction, the air-conditioning case defines a plurality of introducing openings at positions outside of the projected region, and at least a first one of the plurality of introducing openings is located on a side of the projected region opposite to at least a second one of the plurality of introducing openings that is other than the at least the first one of the plurality of introducing openings.

2. The air-conditioning unit according to claim 1, wherein the projected region of the air-conditioning case includes a portion that defines a gap in the axial direction between the portion and the cooling heat exchanger, a gap in the axial direction is defined between the cooling heat exchanger and a region of the air-conditioning case that is virtually formed by projecting the non-facing portion toward an upstream side of the air-conditioning case, and the gap between the portion of the projected region and the cooling heat exchanger is less than the gap between the cooling heat exchanger and the region of the air-conditioning case.

3. The air-conditioning unit according to claim 2, wherein
the projected region of the air-conditioning case has at least a portion protruding toward the cooling heat exchanger.

4. The air-conditioning unit according to claim 3, wherein
the projected region of the air-conditioning case as a whole protrudes toward the cooling heat exchanger.

5. The air-conditioning unit according to claim 2, wherein
the air-conditioning case includes a protrusion protruding from at least a portion of the projected region toward the cooling heat exchanger.

6. The air-conditioning unit according to claim 5, wherein
the air-conditioning case includes a rib having an annular shape and surrounding the projected region, and
the rib serves as the protrusion.

7. The air-conditioning unit according to claim 1, wherein
the air-conditioning case includes an opening-closing member at a position upstream of the cooling heat exchanger in the airflow direction, the opening-closing member configured to move to selectively open and close at least one of the plurality of introducing openings, and
the opening-closing member serves as a guide member configured to guide, toward the non-facing portion of the cooling heat exchanger, an air flowing through the at least one of the plurality of introducing openings when the opening-closing member is at an opening position to open the at least one of the plurality of introducing openings.

* * * * *